United States Patent
Shibutani et al.

(10) Patent No.: US 12,359,076 B2
(45) Date of Patent: Jul. 15, 2025

(54) WATER-SOLUBLE RESIN FOR PRINTING

(71) Applicant: KAO CORPORATION, Tokyo (JP)

(72) Inventors: Ryo Shibutani, Wakayama (JP); Gota Katayanagi, Wakayama (JP); Tadanori Yoshimura, Wakayama (JP); Akihiro Onoue, Wakayama (JP); Takahiro Noro, Wakayama (JP); Keiji Sasaki, Wakayama (JP)

(73) Assignee: KAO CORPORATION, Tokyo (JP)

( * ) Notice: Subject to any disclaimer, the term of this patent is extended or adjusted under 35 U.S.C. 154(b) by 915 days.

(21) Appl. No.: 17/605,610

(22) PCT Filed: Apr. 24, 2020

(86) PCT No.: PCT/JP2020/017691
§ 371 (c)(1),
(2) Date: Oct. 22, 2021

(87) PCT Pub. No.: WO2020/218509
PCT Pub. Date: Oct. 29, 2020

(65) Prior Publication Data
US 2022/0315778 A1    Oct. 6, 2022

(30) Foreign Application Priority Data

Apr. 26, 2019 (JP) .................... 2019-085036
Jun. 27, 2019 (JP) .................... 2019-119695

(51) Int. Cl.
C09D 11/00 (2014.01)
C09D 11/102 (2014.01)
C09D 181/08 (2006.01)

(52) U.S. Cl.
CPC .......... *C09D 11/102* (2013.01); *C09D 181/08* (2013.01)

(58) Field of Classification Search
CPC .................... C09D 11/102; C09D 181/08
USPC .......................... 106/31.01, 31.13
See application file for complete search history.

(56) References Cited

U.S. PATENT DOCUMENTS

| | | | |
|---|---|---|---|
| 5,276,149 A | 1/1994 | Adams et al. | |
| 5,294,650 A * | 3/1994 | Sharma | C08L 33/04 523/501 |
| 5,376,149 A * | 12/1994 | Defieuw | B41M 5/44 503/227 |
| 2016/0326337 A1 | 11/2016 | Farrugia et al. | |
| 2018/0009160 A1 | 1/2018 | Sawada et al. | |
| 2021/0087341 A1 | 3/2021 | Sawada et al. | |

FOREIGN PATENT DOCUMENTS

| | | |
|---|---|---|
| CN | 107206673 A | 9/2017 |
| CN | 107722711 A | 2/2018 |
| JP | H02-235972 A | 9/1990 |
| JP | 2001055236 A | 2/2001 |
| JP | 2001131484 A | 5/2001 |
| JP | 2001350411 A | 12/2001 |
| JP | 2002265832 A | 9/2002 |
| JP | 2017030346 A | 2/2017 |
| JP | 2017154464 A * | 9/2017 |
| WO | WO-9603467 A1 | 2/1996 |
| WO | WO-2019013317 A1 | 1/2019 |

OTHER PUBLICATIONS

Extended European Search Report issued Dec. 15, 2022 in Patent Application No. 20793961.2, 5 pages.
International Search Report issued Jul. 21, 2020 in PCT/JP2020/017691, 3 pages.
English translation of the International Preliminary Report on Patentability issued Nov. 4, 2021 in PCT/JP2020/017691, 7 pages.
English translation of Chinese Search Report issued Mar. 16, 2022 in CN Patent Application No. 202080031373.9, 1 page.

* cited by examiner

*Primary Examiner* — James E McDonough
(74) *Attorney, Agent, or Firm* — Element IP, PLC

(57) ABSTRACT

The water-soluble resin for printing of the present invention includes a monomer unit A having a sulfonate group; and a monomer unit B having no hydrophilic group, and a percentage of the monomer unit A based on a total of all monomer units is 5 to 35 mol %. According to the water-soluble resin for printing of the present invention, a printed matter from which a printing layer can be safely and efficiently removed with neutral water and which is excellent in water resistance can be realized.

18 Claims, No Drawings

WATER-SOLUBLE RESIN FOR PRINTING

TECHNICAL FIELD

The present invention relates to a water-soluble resin for printing, and more specifically to a water-soluble resin for printing capable of realizing a printed matter from which a printing layer can be safely and efficiently removed with neutral water and which is excellent in water resistance.

BACKGROUND ART

In recent years, plastics have been used in a very wide variety of applications such as containers and packaging bags, and many of them are composed of completely different types of films, inorganic substances such as aluminum, inks and the like for functional reasons. In particular, printed matters in which inks or the like are used are indispensable in information transmission to general consumers and product distribution management for containers and packaging bags, and are printed or print-processed on the surface of containers or the like.

Plastics are partially separated and collected, and are recycled and used as secondary products because of plastics being less likely to decompose in nature, and for resource saving, economic efficiency and the like. However, when plastic products on which printing or the like has been performed are mixed at the time of recycling, the entire recycled products are colored or partially colored. Thus, such plastic products cannot be reused in many cases because coloring of recycled products significantly lowers the commercial value. Physically fatal defects may be also caused. Such plastic products on which printing or the like has been performed are currently discarded without being collected (for reuse).

In view of the current state where plastic films, plastic containers and the like on which printing or the like has been performed are rarely reused, and are mostly discarded, a method for removing printed matters from plastic products has been conventionally studied from the viewpoint of recycling plastics on which printing has been performed (for example, JP-A-2001-131484).

SUMMARY OF THE INVENTION

The present invention is a water-soluble resin for printing including a monomer unit A having a sulfonate group; and a monomer unit B having no hydrophilic group, wherein a percentage of the monomer unit A based on a total of all monomer units is 5 to 35 mol %.

MODE FOR CARRYING OUT THE INVENTION

In the technique described in JP-A-2001-131484 above, an alkaline aqueous solution is used to remove an ink layer. An alkaline aqueous solution has a high risk for the human body, and needs to be handled with care. In addition, when printed matters are immersed in an alkaline aqueous solution, substrates are eroded by the alkali, and recycling may become impossible.

One idea to solve the above-mentioned problems is an ink containing a water-soluble material that can be dissolved in neutral water such as polyvinyl alcohol. However, conventional water-soluble materials have poor water resistance, and thus, when conventional water-soluble materials are used in printed matters that are often placed in an environment with relatively high humidity (for example, household detergent containers or the like), the printing layer may be peeled off due to humidity in the environment.

The present invention provides a water-soluble resin for printing capable of realizing a printed matter from which a printing layer can be safely and efficiently removed with neutral water and which is excellent in water resistance.

The present invention is a water-soluble resin for printing including a monomer unit A having a sulfonate group; and a monomer unit B having no hydrophilic group, wherein a percentage of the monomer unit A based on a total of all monomer units is 5 to 35 mol %.

According to the present invention, a water-soluble resin for printing capable of realizing a printed matter from which a printing layer can be safely and efficiently removed with neutral water and which is excellent in water resistance can be provided.

One embodiment according to the present invention is explained below.

<Water-Soluble Resin for Printing (Component α)>

The water-soluble resin for printing of the present embodiment includes a monomer unit A having a sulfonate group; and a monomer unit B having no hydrophilic group other than the hydrophilic group that constitutes the polymerization related to the production of the resin (hereinafter, also simply referred to as a hydrophilic group), and a percentage of the monomer unit A based on a total of all monomer units is 5 to 35 mol %. According to the water-soluble resin for printing of the present embodiment, a printed matter from which a printing layer can be safely and efficiently removed with neutral water and which is excellent in water resistance can be realized. In the present specification, the term "water-soluble" means that a resin dissolves in 100 g of neutral water at 30° C. in an amount of 0.01 g or more.

From the viewpoint of safely and efficiently removing a printing layer with neutral water, the resin composition preferably dissolves in neutral water at 70° C. in an amount of 1% by mass or more, more preferably dissolves in neutral water at 70° C. in an amount of 5% by mass or more, and still more preferably dissolves in neutral water at 70° C. in an amount of 10% by mass or more.

Examples of the neutral water include water and an aqueous solution having a pH of 6 to 8. Specific examples of the neutral water include deionized water, pure water, tap water, and industrial water, and deionized water or tap water is preferable from the viewpoint of availability. The neutral water can contain other components such as a water-soluble organic solvent and a surfactant. Examples of the water-soluble organic solvent include lower alcohols such as methanol, ethanol, and 2-propanol, glycol ethers such as propylene glycol monomethyl ether, ethylene glycol monoethyl ether, ethylene glycol mono-tertiary butyl ether, and diethylene glycol monobutyl ether, and ketones such as acetone and methyl ethyl ketone. Examples of the surfactant include anionic surfactants such as an alkyl sulphate ester salt, an alkyl ether sulphate ester salt, an olefin sulfonate, and an alkyl ether carboxylate; cationic surfactants such as alkyltrimethylammonium salt; and nonionic surfactants such as polyoxyethylene alkyl ether and alkyl glycoside.

Examples of the water-soluble resin include a water-soluble polyester resin, a water-soluble polyamide resin, a water-soluble polyimide resin, a water-soluble acrylic resin, a water-soluble polyurethane resin, a water-soluble polyallylamine resin, a water-soluble phenol resin, a water-soluble epoxy resin, a water-soluble phenoxy resin, a water-soluble urea resin, a water-soluble melamine resin, a polyvinyl alcohol resin, and modified products of these resins. These can be used singly or in combination of two or more types thereof. Among them, from the viewpoint of exhibiting the effects of the present invention, at least one selected from the group consisting of a water-soluble polyester resin, a water-soluble polyamide resin, and a water-soluble acrylic resin are preferable, and a water-soluble polyester resin is more preferable.

[Monomer Unit A]

The monomer unit A has a sulfonate group. The monomer from which the monomer unit A is derived is referred to as a monomer A.

Though the monomer unit A is not particularly limited as long as the monomer unit A is a monomer unit having a sulfonate group, a dicarboxylic acid monomer unit having a sulfonate group (hereinafter, also referred to as a dicarboxylic acid monomer unit A) is preferable from the viewpoint of achieving removal of a printing layer with neutral water and the viewpoint of improving the water resistance of a printed matter.

The monomer A is preferably at least one selected from the group consisting of carboxylic acids having a sulfonate group, amines, and amino acids, and more preferably carboxylic acids having a sulfonate group from the viewpoint of achieving removal of a printing layer with neutral water, the viewpoint of improving the water resistance of a printed matter, and the viewpoint of ease of polymerization reaction during production of the water-soluble resin. Among the carboxylic acids, at least one selected from the group consisting of aromatic carboxylic acids having a sulfonate group are more preferable, and at least one selected from the group consisting of sulfonate group-containing aromatic dicarboxylic acids are more preferable from the same viewpoint. Among them, at least one selected from the group consisting of sulfophthalic acids and sulfonaphthalenedicarboxylic acid are preferable, at least one selected from the group consisting of sulfophthalic acids are still more preferable, at least one selected from the group consisting of sulfoisophthalic acids and sulfoterephthalic acids are still more preferable, and 5-sulfoisophthalic acid is further preferable from the same viewpoint.

The sulfonate group is preferably a sulfonate group represented by —SO$_3$M$^3$ (M$^3$ represents a counterion of a sulfonic acid group that constitutes the sulfonate group, and from the viewpoint of achieving removal of a printing layer with neutral water, M$^3$ is preferably at least one selected from the group consisting of a metal ion and an ammonium ion, more preferably at least one selected from the group consisting of a metal ion, still more preferably at least one selected from the group consisting of an alkali metal ion and an alkaline earth metal ion, still more preferably at least one selected from the group consisting of an alkali metal ion, still more preferably at least one selected from the group consisting of a sodium ion and a potassium ion, and still more preferably a sodium ion.) from the viewpoint of achieving removal of a printing layer with neutral water and the viewpoint of ease of polymerization reaction during production of the water-soluble resin.

The content of the sulfonate group in the water-soluble resin is preferably 0.4 mmol/g or more, more preferably 0.6 mmol/g or more, and still more preferably 0.7 mmol/g or more from the viewpoint of achieving removal of a printing layer with neutral water, and is preferably 3 mmol/g or less, more preferably 2 mmol/g or less, and still more preferably 1.5 mmol/g or less from the viewpoint of improving the water resistance of a printed matter. The content of the sulfonate group in the water-soluble resin is preferably 0.4 to 3 mmol/g, more preferably 0.6 to 2 mmol/g, and still more preferably 0.7 to 1.5 mmol/g from the viewpoint of achieving removal of a printing layer with neutral water and the viewpoint of improving the water resistance of a printed matter.

The percentage of the monomer unit A based on a total of all monomer units of the water-soluble resin is 5 mol % or more, preferably 7 mol % or more, more preferably 10 mol % or more, and still more preferably 12 mol % or more from the viewpoint of achieving removal of a printing layer with neutral water, and is 35 mol % or less, preferably 30 mol % or less, and more preferably 20 mol % or less from the viewpoint of improving the water resistance of a printed matter. The percentage of the monomer unit A based on a total of all monomer units of the water-soluble resin is 5 to 35 mol %, preferably 7 to 30 mol %, more preferably 10 to 20 mol %, and still more preferably 12 to 20 mol % from the viewpoint of achieving removal of a printing layer with neutral water and the viewpoint of improving the water resistance of a printed matter.

[Monomer Unit B]

The monomer unit B has no hydrophilic group. The monomer from which the monomer unit B is derived is referred to as a monomer B. Though the monomer unit B is not particularly limited as long as the monomer unit B is a monomer unit having no hydrophilic group, a dicarboxylic acid monomer unit having no hydrophilic group (hereinafter, also referred to as a dicarboxylic acid monomer unit B) is preferable from the viewpoint of achieving removal of a printing layer with neutral water and the viewpoint of improving the water resistance of a printed matter.

The hydrophilic group is not particularly limited as long as the hydrophilic group exhibits hydrophilicity. Examples of the hydrophilic group include a primary amino group, a secondary amino group, a tertiary amino group, a quaternary ammonium group, an oxyalkylene group, a hydroxyl group, a carboxyl group, a carboxyl group, a phosphoric acid group, a phosphate group, a sulfonic acid group, and a sulfonate group.

The dicarboxylic acid from which the dicarboxylic acid monomer unit B is derived (hereinafter, also referred to as a dicarboxylic acid monomer B) is more preferably at least one selected from the group consisting of an aromatic dicarboxylic acid having no hydrophilic group and an aliphatic dicarboxylic acid having no hydrophilic group, and more preferably at least one selected from the group consisting of an aromatic dicarboxylic acid having no hydrophilic group from the viewpoint of achieving removal of a printing layer with neutral water, the viewpoint of improving the water resistance of a printed matter, and the viewpoint of ease of polymerization reaction during production of the water-soluble resin.

The percentage of a total of the aromatic dicarboxylic acid based on a total of the dicarboxylic acid monomer B is preferably 50 mol % or more, more preferably 60 mol % or more, and still more preferably 70 mol % or more from the viewpoint of achieving removal of the printing layer with neutral water.

The percentage of a total of the aromatic dicarboxylic acid based on a total of the monomer B is preferably 100 mol % or less, more preferably 80 mol % or less, and still more preferably 70 mol % or less from the viewpoint of improving the water resistance of the printing layer.

Examples of the aromatic dicarboxylic acid having no hydrophilic group include at least one selected from the group consisting of terephthalic acid, isophthalic acid, 2,5-furandicarboxylic acid, and 2,6-naphthalenedicarboxylic acid. Among them, at least one selected from the group consisting of terephthalic acid, isophthalic acid, and 2,6-naphthalenedicarboxylic acid are preferable from the viewpoint of achieving removal of a printing layer with neutral water and the viewpoint of improving the water resistance of a printed matter.

Examples of the aliphatic dicarboxylic acid having no hydrophilic group include at least one selected from the group consisting of malonic acid, succinic acid, glutaric acid, adipic acid, 1,4-cyclohexanedicarboxylic acid, and 1,3-adamantanedicarboxylic acid. Among them, at least one selected from the group consisting of adipic acid and 1,4-cyclohexanedicarboxylic acid are preferable from the viewpoint of achieving removal of a printing layer with neutral water and the viewpoint of improving the water resistance of a printed matter.

The percentage of the amount of substance of the monomer unit B based on a total of the amount of substance of all monomer units in the water-soluble resin is preferably 15 mol % or more, more preferably 25 mol % or more, and still more preferably 30 mol % or more from the viewpoint of improving the water resistance of a printed matter, and is preferably 45 mol % or less, more preferably 42 mol % or less, and still more preferably 40 mol % or less from the viewpoint of achieving removal of a printing layer with neutral water. The percentage of the amount of substance of the monomer unit B based on a total of the amount of substance of all monomer units in the water-soluble resin is preferably 15 to 45 mol %, more preferably 25 to 42 mol %, and still more preferably 30 to 40 mol % from the viewpoint of improving the water resistance of a printed matter and the viewpoint of achieving removal of a printing layer with neutral water.

The molar ratio of the monomer unit A to the monomer unit B in the water-soluble resin (the monomer unit A/the monomer unit B) is preferably 10/90 or more, more preferably 15/85 or more, still more preferably 18/82 or more, and still more preferably 20/80 or more from the viewpoint of achieving removal of a printing layer with neutral water and the viewpoint of improving the water resistance of a printed matter, and preferably 70/30 or less, more preferably 65/35 or less, still more preferably 60/40 or less, still more preferably 40/60 or less, and still more preferably 35/70 or less from the same viewpoint.

The weight average molecular weight of the water-soluble resin is preferably 1000 or more, more preferably 3000 or more, and still more preferably 4000 or more from the viewpoint of improving the water resistance of a printing layer, and is preferably 80,000 or less, more preferably 50,000 or less, still more preferably 30,000 or less, and still more preferably 20,000 or less from the viewpoint of achieving removal of a printing layer with neutral water. In the present specification, the weight average molecular weight is measured by the method described in Examples.

(Diol Monomer Unit C)

When the water-soluble resin is a water-soluble polyester resin, the water-soluble resin includes a diol monomer unit C other than the monomer unit A and the monomer unit B. The diol from which the diol monomer unit C is derived is also referred to as a diol C.

As the diol C, an aliphatic diol, an aromatic diol and the like can be used, and an aliphatic diol is preferable from the viewpoint of availability of raw materials of the water-soluble polyester resin.

The carbon number of the diol C is preferably 2 or more from the viewpoint of achieving removal of a printing layer with neutral water and the viewpoint of improving the water resistance of a printed matter, and is preferably 31 or less, more preferably 25 or less, still more preferably 20 or less, and still more preferably 15 or less from the same viewpoint.

Examples of the aliphatic diol include at least one selected from the group consisting of a chain diol and a cyclic diol, and a chain diol is preferable from the viewpoint of availability of raw materials and a cyclic diol is preferable from the viewpoint of achieving removal of a printing layer with neutral water.

The percentage of a total of the cyclic diol based on a total of the diol C is preferably 1 mol % or more, more preferably 10 mol % or more, and still more preferably 40 mol % or more from the viewpoint of achieving removal of a printing layer with neutral water, and is preferably 90 mol % or less, more preferably 70 mol % or less, and still more preferably 60 mol % or less from the viewpoint of availability of raw materials.

The carbon number of the chain diol is preferably 2 or more from the viewpoint of improving the water resistance of a printing layer, and is preferably 20 or less, still more preferably 15 or less, and still more preferably 6 or less from the viewpoint of achieving removal of the printing layer with neutral water.

The chain diol is preferably at least one selected from the group consisting of ethylene glycol, 1,2-propanediol, 1,3-propanediol, 1,4-butanediol, 1,2-butanediol, 1,3-butanediol, neopentyl glycol, 1,5-pentanediol, 1,6-hexanediol, diethylene glycol, triethylene glycol, polyethylene glycol, dipropylene glycol, and polypyrene glycol, more preferably at least one selected from the group consisting of ethylene glycol, 1,2-propanediol, 1,3-propanediol, and triethylene glycol, and still more preferably at least one selected from the group consisting of ethylene glycol, 1,3-propanediol, and triethylene glycol from the viewpoint of achieving removal of a printing layer with neutral water and the viewpoint of improving the water resistance of a printed matter.

The carbon number of the cyclic diol is preferably 2 or more, more preferably 4 or more, still more preferably 6 or more from the viewpoint of improving the water resistance of a printing layer, and is preferably 31 or less, still more preferably 25 or less, still more preferably 20 or less, still more preferably 12 or less, and still more preferably 8 or less from the viewpoint of improving the water resistance of a printing layer.

The cyclic diol is preferably at least one selected from the group consisting of 1,4-cyclohexanedimethanol, hydrogenated bisphenol A, isosorbide, bisphenoxyethanolfluorene, bisphenol fluorene, biscresoxyethanolfluorene, and biscresol fluorene, and more preferably one or two selected from the group consisting of 1,4-cyclohexanedimethanol and isosorbide from the viewpoint of achieving removal of a printing layer with neutral water and the viewpoint of improving the water resistance of a printed matter.

The water-soluble polyester resin can have monomer units other than the dicarboxylic acid monomer unit A, the dicarboxylic acid monomer unit B, and the diol monomer unit C as long as the effects of the present embodiment are not impaired.

The method for producing the water-soluble polyester resin is not particularly limited, and a conventionally known method for producing a polyester resin can be applied.

<Water-Soluble Resin Composition for Printing>

The water-soluble resin for printing can be a water-soluble resin composition for printing containing other components.

The content of the water-soluble resin in the water-soluble resin composition for printing is preferably 30% by mass or more, more preferably 50% by mass or more, more preferably 70% by mass or more, and still more preferably 90% by mass or more, and is preferably 100% by mass or less, more preferably 98% by mass, and still more preferably 96% by mass or less from the viewpoint of achieving removal of a printing layer with neutral water and the viewpoint of improving the water resistance of a printed matter.

(Salt Other than the Water-Soluble Resin (Component β))

The water-soluble resin composition can contain a salt other than the water-soluble resin (component β). The component β is preferably an organic salt compound represented by the following General Formula (1) from the viewpoint of achieving removal of a printing layer with neutral water and the viewpoint of improving the water resistance and heat resistance of a printed matter.

$(R^1-SO_3^-)_n X^{n+}$          (1)

(In the General Formula (1), $R^1$ represents a hydrocarbon group optionally having a substituent and having 1 to 30 carbon atoms, n represents a number of 1 or 2, $X^{n+}$ represents a sodium ion, a potassium ion, a lithium ion, an ammonium ion, or a phosphonium ion when n is 1, and $X^{n+}$ represents a magnesium ion, a calcium ion, a barium ion, or a zinc ion when n is 2.)

In the General Formula (1), $R^1$ represents a hydrocarbon group optionally having a substituent and having 1 to 30 carbon atoms including the carbon atoms of the substituent from the viewpoint of achieving removal of a printing layer with neutral water and the viewpoint of improving heat resistance. The hydrocarbon group can be any of an aliphatic hydrocarbon group, an alicyclic hydrocarbon group, and an aromatic hydrocarbon group. When the hydrocarbon group is an aromatic hydrocarbon group, the carbon number of the hydrocarbon group is preferably 6 or more, more preferably 8 or more, still more preferably 10 or more, and preferably 30 or less, and more preferably 25 or less from the viewpoint of achieving removal of a printing layer with neutral water and the viewpoint of improving heat resistance.

As the substituent, a substituent containing at least one selected from the group consisting of a carbon atom, an oxygen atom, a nitrogen atom, a sulfur atom, a phosphorus atom, a silicon atom, and a halogen atom is preferable, among them, a hydrocarbon group having 1 to 22 carbon atoms or an alkyl halide group having 1 to 22 carbon atoms is preferable, a hydrocarbon group having 1 to 16 carbon atoms is more preferable, and a hydrocarbon group having 1 to 12 carbon atoms is still more preferable from the viewpoint of achieving removal of a printing layer with neutral water and the viewpoint of improving heat resistance.

In the General Formula (1), $X^{n+}$ represents a sodium ion, a potassium ion, a lithium ion, an ammonium ion, a phosphonium ion, a magnesium ion, a calcium ion, a barium ion, a zinc ion, or a phosphonium ion, is preferably a sodium ion, a potassium ion, a lithium ion, an ammonium ion, or a phosphonium ion, and is still more preferably a phosphonium ion from the viewpoint of achieving removal of a printing layer with neutral water and the viewpoint of improving heat resistance. Among phosphonium ions, a tetraalkylphosphonium ion is preferable, and a tetrabutylphosphonium ion is more preferable from the viewpoint of achieving removal of a printing layer with neutral water and the viewpoint of improving heat resistance.

In the General Formula (1), n is preferably 1 from the viewpoint of achieving removal of a printing layer with neutral water and the viewpoint of improving heat resistance.

The content of the organic salt compound in the water-soluble resin composition is preferably 0.1% by mass or more, more preferably 1% by mass or more, and still more preferably 4% by mass or more from the viewpoint of achieving removal of a printing layer with neutral water, and is preferably 20% by mass or less, more preferably 10% by mass or less, and still more preferably 5% by mass or less from the viewpoint of achieving removal of a printing layer with neutral water.

For the content of the organic salt compound in the water-soluble resin composition, a ratio of the amount of substance (mol) of the alkyl sulfonic acid ion ($R^1-SO_3^-$) of the organic salt compound to a total of the amount of substance (mol) of the hydrophilic group and the amount of substance (mol) of the sulfonate group of the water-soluble resin (amount of substance of alkyl sulfonic acid ion of the organic salt compound/total of amount of substance of hydrophilic group and amount of substance of sulfonate group of the water-soluble resin) is preferably 0.005 or more, more preferably 0.01 or more, still more preferably 0.02 or more, and still more preferably 0.03 or more from the viewpoint of achieving removal of a printing layer with neutral water, and is preferably 0.35 or less, more preferably 0.25 or less, and still more preferably 0.2 or less from the viewpoint of achieving removal of a printing layer with neutral water.

(Compatibilizer (Component γ))

The water-soluble resin composition can contain a compatibilizer from the viewpoint of improving adhesiveness to a substrate and a printing layer. Examples of the compatibilizer include Bondfast (registered trademark) 7B and Bondfast 7M (manufactured by Sumitomo Chemical Co., Ltd.); Rotador (registered trademark) AX8840 (manufactured by Arkema Inc.); JONCRYL (registered trademark) ADR4370S, JONCRYL ADR4368CS, JONCRYL ADR4368F, and JONCRYL ADR4300S (manufactured by BASF SE); and ARUFON (registered trademark) UG4035, ARUFON UG4040, and ARUFON UG4070 (manufactured by Toagosei Co., Ltd.). Examples of the reactive compatibilizer having an acid anhydride group include UMEX (registered trademark) 1010 (manufactured by SANYO CHEMICAL INDUSTRIES, LTD.); ADMER (registered trademark) (manufactured by Mitsui Chemicals, Inc.); MODIPER (registered trademark) A8200 (manufactured by NOF CORPORATION); OREVAC (registered trademark) (manufactured by Arkema Inc.); FG1901 and FG1924 (manufactured by KRATON CORPORATION); and Tuftec (registered trademark) M1911, Tuftec M1913, and Tuftec M1943 (manufactured by Asahi Kasei Chemicals Corporation). Examples of the reactive compatibilizer having an isocyanate group include CARBODILITE LA-1 (registered trademark) manufactured by Nisshinbo Chemical Inc.

The content of the component γ relative to 100 parts by mass of the component α of the water-soluble resin composition is preferably 1 part by mass or more, more preferably 2 parts by mass or more, and still more preferably 3 parts by mass or more from the viewpoint of improving the water resistance of a printing layer, and is preferably 20 parts by mass or less, and more preferably 10 parts by mass or less from the same viewpoint.

The water-soluble resin composition can contain other components as long as the effects of the present invention are not impaired. Examples of the other components include resins other than the component α, plasticizers such as benzoic acid polyalkylene glycol diester, fillers such as calcium carbonate, magnesium carbonate, glass spheres, graphite, carbon black, carbon fiber, glass fiber, talc, wollastonite, mica, alumina, silica, kaolin, whisker, and silicon carbide, and elastomers.

In addition, if necessary, known substances such as an ultraviolet absorber, an antioxidant, a silicon additive, a fluorine additive, an antistatic agent, a silane coupling agent, an adhesion aid, a rheology control agent, an antifogging agent, a colorant, a crosslinking agent, a pH adjustor, a film forming agent, a leveling agent, a thickener, a water repellent agent, and an antifoaming agent can be appropriately added.

Examples of the elastomers include an acrylic elastomer, an olefin elastomer, a styrene elastomer, a polyester elastomer, a urethane elastomer, a polyamide elastomer, and a silicone elastomer. Among these, at least one selected from the group consisting of an acrylic elastomer and a styrene elastomer are preferable, and an acrylic elastomer is more preferable. The styrene elastomer is preferably at least one selected from the group consisting of a styrene-butadiene copolymer and a styrene-butadiene-ethylene copolymer. The acrylic elastomer is preferably a methacrylic acid-alkyl acrylate copolymer. Examples of commercially available products of the elastomer include KURARITY (registered trademark) LA2250, KURARITY LA2140, and KURARITY LA4285 (manufactured by KURARAY CO., LTD.). Examples of the olefin elastomer include Kraton (registered trademark) ERS polymer (manufactured by Kraton Corporation); Kraton A polymer and Kraton G polymer (manufactured by Kraton Corporation); "Tuftec H" series and "Tuftec P" series (manufactured by Asahi Kasei Chemicals Corporation); and SEPTON (registered trademark) and HYBRAR (registered trademark) (KURARAY PLASTICS CO., Ltd.).

The content of the elastomer of the water-soluble resin composition relative to 100 parts by mass of the component α is preferably 0.1 parts by mass or more, more preferably 1 part by mass or more, and still more preferably 10 parts by mass or more from the viewpoint of improving the water resistance of a printing layer, and is preferably 100 parts by mass or less, more preferably 60 parts by mass or less, still more preferably 40 parts by mass or less, and still more preferably 20 parts by mass or less from the same viewpoint.

When the water-soluble resin for printing or the water-soluble resin composition for printing is contained in a printing layer, solubility in neutral water can be imparted to the printing layer. That is, the water-soluble resin for printing and the water-soluble resin composition for printing can be used as a solubility imparting agent for imparting solubility in neutral water to a printing layer. When the water-soluble resin for printing and the water-soluble resin composition for printing are used as a vehicle for printing, solubility in neutral water can be imparted to a printing layer. By using the water-soluble resin for printing or the water-soluble resin composition for printing in a printing primer, a printed matter from which a printing layer can be safely and efficiently removed with neutral water and which is excellent in water resistance can be realized.

<Method for Producing Printed Matter and Method for Removing Printing Layer>

First Embodiment

[Method for Producing Printed Matter]
The method for producing a printed matter according to the first embodiment includes a water-soluble printing layer forming step of forming a water-soluble printing layer containing the water-soluble resin for printing on a substrate. The printed matter includes a water-soluble printing layer containing the water-soluble resin for printing.

(Water-Soluble Printing Layer Forming Step)
The water-soluble printing layer forming step is a step of forming a water-soluble printing layer containing the water-soluble resin for printing on a substrate.

The substrate is not particularly limited as long as printing can be performed on the substrate. The component of the substrate on which printing is performed is also not particularly limited, and examples thereof include a resin substrate, a metal substrate, a glass substrate, a paper substrate, a wood substrate, and a fibrous substrate. Further, examples of the resin substrate include synthetic resins such as nylon resins such as nylon 6, nylon 11, nylon 12, nylon 46, and nylon 66, polyester resins such as polyethylene terephthalate (PET), polytrimethylene terephthalate (PTT), polybutylene terephthalate (PBT), polyethylene naphthalate (PEN), polybutylene naphthalate (PBN), polylactic acid (PLA), and polyhydroxyalkanoate (PHA), polyolefin resins such as polyethylene (PE), polypropylene (PP), and acrylonitrile butadiene styrene (ABS), acryl resins, vinyl chloride resins, polycarbonate resins, polystyrene resins, and ethylene-vinyl alcohol copolymer resins.

The printing method used in the water-soluble printing layer forming step is not particularly limited, and for example, an inkjet printing method, a letterpress printing method, an intaglio printing method, a flat plate printing method, a stencil printing method can be used.

The ink used for printing in the water-soluble printing layer forming step is an ink suitable for the printing method used in the printing layer forming step, and is not particularly limited as long as the water-soluble resin for printing is contained. The ink used for printing in the water-soluble printing layer forming step can be one obtained by adding the water-soluble resin for printing to a known ink, or one obtained by adding a pigment or other additives to a vehicle for a printing ink containing the water-soluble resin for printing.

(Vehicle for Printing Ink)
The vehicle for a printing ink contains the water-soluble resin for printing, a water-soluble organic solvent, a surfactant, and water.

(Water-Soluble Organic Solvent)
The water-soluble organic solvent can be a liquid or a solid at normal temperature (25° C.). In the present specification, the water-soluble organic solvent refers to an organic solvent having an amount of dissolution of 10 mL or more when the organic solvent is dissolved in 100 mL of water at 25° C.

The total amount of the water-soluble organic solvent in the vehicle for a printing ink is preferably 1% by mass or more, more preferably 5% by mass or more, and still more preferably 6% by mass or more from the viewpoint of improving the leveling property, and is 70% by mass or less, preferably 60% by mass or less, and more preferably 55% by mass or less from the viewpoint of reducing the environmental load.

The boiling point of the water-soluble organic solvent can be less than 100° C. Examples of the water-soluble organic solvent having a boiling point of less than 100° C. include monohydric alcohols such as ethanol, 2-propanol, and 1-propanol, and among these, 2-propanol is preferable.

The content of the water-soluble organic solvent having a boiling point of less than 100° C. in the vehicle for a printing ink is preferably 1% by mass or more, more preferably 10% by mass or more, and still more preferably 50% by mass or more from the viewpoint of improving the leveling property, and is preferably 70% by mass or less, more preferably 60% by mass or less, and still more preferably 55% by mass or less from the viewpoint of improving the leveling property.

The water-soluble organic solvent can contain a glycol ether having a boiling point of 100° C. or more and 260° C. or less from the viewpoint of improving the leveling property.

The molecular weight of the glycol ether is preferably 70 or more, more preferably 100 or more, and still more preferably 140 or more, and is preferably 200 or less, more preferably 190 or less, and still more preferably 180 or less.

The boiling point of the glycol ether is preferably 110° C. or more, more preferably 150° C. or more, and still more preferably 170° C. or more, and is preferably 240° C. or less, more preferably 210° C. or less, and still more preferably 200° C. or less from the viewpoint of improving the leveling property. The boiling point represents a normal boiling point (boiling point under normal atmospheric pressure). When two or more types of glycol ethers are used, the boiling point of the glycol ethers is a weighted average efficiency weighted by the content (% by mass) of each glycol ether.

Examples of the glycol ether include alkylene glycol monoalkyl ether and alkylene glycol dialkyl ether.

The carbon number of the alkyl group of the glycol ether is preferably 1 or more, and more preferably 2 or more, and is preferably 6 or less, and more preferably 5 or less. The alkyl group is preferably a branched chain.

The alkylene glycol monoalkyl ether is preferably at least one selected from alkylene glycol monoalkyl ether and an alkylene glycol dialkyl ether, more preferably alkylene glycol monoalkyl ether, and still more preferably diethylene glycol monoisobutyl ether from the viewpoint of improving the drying property and the leveling property.

The content of the glycol ether in the vehicle for a printing ink is 1% by mass or more, preferably 5% by mass or more, and more preferably 6% by mass or more from the viewpoint of improving the leveling property, and is 10% by mass or less, preferably 9% by mass or less, and more preferably 8% by mass or less from the viewpoint of improving the leveling property.

The mass ratio of the glycol ether to the total amount of the water-soluble organic solvent in the vehicle for a printing ink [glycol ether/total amount of water-soluble organic solvent] is preferably 5/10 to 10/10, more preferably 6/10 to 10/10, and still more preferably 10/10.

(Surfactant)

The surfactant is preferably at least one selected from an anionic surfactant, a nonionic surfactant other than acetylene glycol surfactants, and an amphoteric surfactant, and two or more of these can be used in combination.

Among them, a nonionic surfactant is preferable from the viewpoint of further improving the leveling property. Examples of the nonionic surfactant include an alcohol surfactant and a silicone surfactant, and two or more of these can be used in combination. A silicone surfactant is preferable from the viewpoint of wettability to a printing substrate.

Examples of the silicone surfactant include dimethylpolysiloxane, polyether-modified silicone, amino-modified silicone, carboxy-modified silicone, methylphenylpolysiloxane, fatty acid-modified silicone, alcohol-modified silicone, aliphatic alcohol-modified silicone, epoxy-modified silicone, fluorine-modified silicone, cyclic silicone, and alkyl-modified silicone. Among them, polyether-modified silicone is preferable from the viewpoint of wettability to a printing substrate, and PEG-11 methyl ether dimethicone is still more preferable.

The surfactant preferably contains an acetylene glycol surfactant. As the acetylene glycol surfactant, an acetylene glycol having 8 or more and 22 or less carbon atoms and an ethylene adduct of the acetylene glycol are preferable, and an acetylene glycol having 8 or more and 22 or less carbon atoms is more preferable from the viewpoint of improving the leveling property. The carbon number of the acetylene glycol is preferably 10 or more, and more preferably 12 or more, and is preferably 20 or less, more preferably 18 or less, and still more preferably 16 or less. Specific examples thereof include at least one acetylene glycols selected from 2,4,7,9-tetramethyl-5-decine-4,7-diol, 3,6-dimethyl-4-octyne-3,6-diol, and 2,5-dimethyl-3-hexyne-2,5-diol, and ethylene oxide adducts of the acetylene glycols from the viewpoint of improving the leveling property. Among them, 2,4,7,9-tetramethyl-5-decine-4,7-diol is preferable.

(Water)

The content of water of the vehicle for a printing ink is preferably 30% by mass or more, more preferably 35% by mass or more, and still more preferably 39% by mass or more from the viewpoint of improving the leveling property while reducing volatile organic compounds, and is preferably 90% by mass or less, more preferably 85% by mass or less, and still more preferably 82% by mass or less from the viewpoint of improving the leveling property while keeping a good drying property. When any other components other than the water-soluble organic solvent, the surfactant, and water are contained in the vehicle for a printing ink, a part of the content of water can be replaced with the content of any other components.

(Ink)

The ink contains the water-soluble resin for printing and a pigment.

(Pigment)

The type of the pigment can be an inorganic pigment or an organic pigment.

Examples of the inorganic pigment include carbon black and metal oxides, and carbon black is preferable for black inks. Examples of the carbon black include furnace black, thermal lamp black, acetylene black, and channel black. Examples of the pigment for white inks include metal oxides such as titanium dioxide, zinc oxide, silica, alumina, and magnesium oxide. These inorganic pigments can be surface-treated with a known hydrophobizing agent such as a titanium coupling agent, a silane coupling agent, and a higher fatty acid metal salt.

Examples of the organic pigment include an azo pigment, a diazo pigment, a phthalocyanine pigment, a quinacridone pigment, an isoindolinone pigment, a dioxazine pigment, a perylene pigment, a perinone pigment, a thioindigo pigment, an anthraquinone pigment, and a quinophthalone pigment.

The hue of the pigment is not particularly limited, and any chromatic color pigments such as yellow, magenta, cyan, red, blue, orange, and green can be used in chromatic color inks.

The content of the pigment in the ink is preferably 1% by mass or more, more preferably 5% by mass or more, still more preferably 9% by mass or more, and is preferably 30% by mass or less, more preferably 15% by mass or less, and still more preferably 10% by mass or less from the viewpoint of print density.

The pigment can be contained in the ink as pigment-containing polymer particles by being dispersed in polymer particles.

The polymer that constitutes the pigment-containing polymer particles is not particularly limited as long as the polymer is a polymer used for an ink. When the polymer is a polymer other than the water-soluble resin for printing (hereinafter, also referred to as a polymer a), both a water-soluble polymer and a water-insoluble polymer can be preferably used as the polymer a. However, a water-insoluble polymer is more preferable.

The water-insoluble polymer refers to a polymer having an amount of dissolution of less than 10 g when the polymer is dried at 105° C. for 2 hours to reach a constant weight, and is dissolved in 100 g of water at 25° C., and the amount of dissolution is preferably less than 5 g and more preferably less than 1 g. In the case of an anionic polymer, the amount of dissolution is an amount of dissolution when the anionic group of the polymer is neutralized by 100% with sodium hydroxide.

Examples of the polymer include polyester, polyurethane, and a vinyl polymer, and a vinyl polymer obtained by addition polymerization of a vinyl monomer such as a vinyl compound, a vinylidene compound, and a vinylene compound is preferable from the viewpoint of dispersion stability of a pigment.

As the vinyl polymer, one that contains a constitutional unit derived from an ionic monomer (a-1) (hereinafter also referred to as "component (a-1)") is preferable, and a water-soluble vinyl polymer obtained by copolymerizing a monomer mixture A containing an ionic monomer (a-1) and a nonionic monomer (a-2) (hereinafter also referred to as "component (a-2)") (hereinafter, also simply referred to as "monomer mixture A") is more preferable. The water-soluble vinyl polymer has a constitutional unit derived from the component (a-1) and a constitutional unit derived from the component (a-2).

The weight average molecular weight of the polymer a is preferably 20,000 or more, more preferably 30,000 or more, and still more preferably 50,000 or more, and is preferably 500,000 or less, more preferably 300,000 or less, still more preferably 200,000 or less, and still more preferably 100,000 or less from the viewpoint of improving the dispersion stability of the pigment particles dispersed with the polymer in the ink and the viewpoint of improving the fixing strength of the ink to the printing substrate.

((a-1) Ionic Monomer)

Examples of the ionic monomer include an anionic monomer and a cationic monomer, and an anionic monomer is preferable.

Examples of the anionic monomer include a carboxylic acid monomer, a sulfonic acid monomer, and a phosphoric acid monomer, and a carboxylic acid monomer is preferable, and acrylic acid is more preferable.

((a-2) Nonionic Monomer)

Examples of the nonionic monomer include a styrene monomer and a hydroxyalkyl (meth)acrylate; polyalkylene glycol (meth)acrylate; alkoxy polyalkylene glycol (meth) acrylate; and phenoxy(ethylene glycol-propylene glycol copolymer) (n=1 to 30, ethylene glycol therein: n=1 to 29) (meth)acrylate, and a styrene monomer is preferable.

As the styrene monomer, styrene, 2-methylstyrene, α-methylstyrene, vinyltoluene, and divinylbenzene are preferable, and styrene is more preferable.

The content of the polymer a in the ink is preferably 0.1% by mass or more, more preferably 0.3% by mass or more, and still more preferably 0.5% by mass or more, and is preferably 10% by mass or less, more preferably 5% by mass or less, still more preferably 3% by mass or less, and still more preferably 1% by mass or less from the viewpoint of fixability.

The mass ratio of the polymer a to the pigment [polymer a/pigment] is preferably 0.2/99.8 to 70/30, more preferably 1/99 to 50/50, still more preferably 10/90 to 40/60, and still more preferably 20/80 to 30/70 from the viewpoint of improving ink stability.

The content of the pigment-containing polymer particles in the ink is preferably 0.1% by mass or more, more preferably 1% by mass or more, and still more preferably 2% by mass or more, and is preferably 40% by mass or less, more preferably 10% by mass or less, still more preferably 5% by mass or less, and still more preferably 3% by mass or less from the viewpoint of printing density and fixability.

The pigment-containing polymer particles can be produced by the method described in Production Example II, paragraph 0083, JP-A-2018-83938.

The ink can contain, as an optional component, various additives such as a pH adjuster, a viscosity modifier, an antifoaming agent, an antiseptic agent, and a rust inhibitor depending on the application.

[Method for Removing Printing Layer]

The method for removing a printing layer of the first embodiment includes a printing layer removing step of treating the printed matter with neutral water at 30° C. or more to remove the water-soluble printing layer.

The temperature of the neutral water for treating the printed matter in the printing layer removing step is preferably 30° C. or more, more preferably 40° C. or more, still more preferably 50° C. or more, and still more preferably 60° C. or more from the viewpoint of efficiently removing the printing layer. The temperature is preferably 100° C. or less, more preferably 90° C. or less, and still more preferably 80° C. or less from the viewpoint of the upper limit of the water temperature and the ease of temperature control in the recycling step.

The method for treating the printed matter with neutral water at 30° C. or more is not particularly limited, and examples thereof include immersion cleaning, electrolytic cleaning, spray cleaning, scrub cleaning, ultrasonic cleaning, and steam cleaning. The printed matter can be treated with the neutral water after being subjected to a treatment such as cutting.

A substrate from which the printing layer has been removed can be obtained by the method for removing a printing layer.

Second Embodiment

[Method for Producing Printed Matter]

The method for producing a printed matter of the second embodiment includes a water-soluble printing primer layer forming step of forming a water-soluble printing primer layer containing the water-soluble resin for printing on a substrate; and a printing layer forming step of forming a printing layer on the water-soluble printing primer layer. The printed matter includes, in sequence, the substrate; the water-soluble printing primer layer containing the water-soluble resin for printing; and the printing layer.

(Water-Soluble Printing Primer Layer Forming Step)

The water-soluble printing primer layer forming step is a step of forming a water-soluble printing primer layer containing the water-soluble resin for a printing primer on a substrate.

The substrate that can be used in the present embodiment is the same as the substrate that can be used in the first embodiment.

The method for forming the water-soluble printing primer layer on the substrate is not particularly limited, and examples thereof include a method of preparing an application liquid containing the water-soluble resin for a printing primer or the water-soluble resin composition for a printing primer, applying the application liquid by a conventional application method such as a gravure method, a letterpress (flexo) method, an offset method, a roll coater method (transfer method), a spray method, a brush coating method, a bar coater method, an inkjet method, a screen method, a die coating method, a spin coating method, a dip method, a meyer bar method, and an air knife method, and then drying the application liquid.

The concentration of the water-soluble resin in the application liquid is preferably 1% by mass or more, more preferably 5% by mass or more, and still more preferably 10% by mass or more, and preferably 60% by mass or less, more preferably 50% by mass or less, and still more preferably 40% by mass or less from the viewpoint of improving the efficiency of application and the uniformity of the printing primer layer.

The solvent used for preparing the application liquid is not particularly limited as long as the solvent is a solvent that can be used as a solvent.

The method for drying the application liquid applied onto the substrate is not particularly limited, and a conventional drying method can be applied.

The thickness of the water-soluble printing primer layer formed on the substrate after drying is preferably 0.1 μm or more, more preferably 0.5 μm or more, and still more preferably 1 μm or more from the viewpoint of preventing the ink or the like related to the printing layer formed on the water-soluble printing primer layer from passing through the water-soluble printing primer layer and adhering to the substrate and the viewpoint of cost reduction, and is preferably 50 μm or less, more preferably 30 μm or less, still more preferably 20 μm or less, and still more preferably 10 μm or less from the viewpoint of flexibility of the primer layer, improvement of productivity, and cost reduction.

(Printing Layer Forming Step)

The printing layer forming step is a step of forming a printing layer on the water-soluble printing primer layer. The printing method used in the printing layer forming step is not particularly limited, and for example, an inkjet printing method, an electrophotographic printing method, a laser printing method, a letterpress printing method, an intaglio printing method, a flat plate printing method, and a stencil printing method can be used.

The ink used for printing is not particularly limited, and examples thereof include an ink suitable for the printing method used in the printing layer forming step. The ink used in the printing layer forming step can contain the water-soluble resin for printing, but does not necessarily need to contain the water-soluble resin for printing.

The formation of the water-soluble printing primer layer and the formation of the printing layer can be performed continuously (in-line), or the formation of the detachment layer and the printing can be performed separately.

[Method for Removing Printing Layer]

The method for removing a printing layer of the second embodiment is the same as the method for removing a printing layer of the first embodiment except that the water-soluble printing primer layer and the printing layer are removed.

By the method for removing a printing layer, a substrate from which the water-soluble printing primer layer and the printing layer have been removed can be obtained.

The printing primer of the present embodiment can be used as a printing primer for a label of a container and the like of a household detergent and the like that are often placed under a high humidity environment.

Regarding the above-mentioned embodiments, the present specification further discloses the following water-soluble resin for printing, vehicle for a printing ink, ink, water-soluble resin composition for a printing primer, printed matter, method for producing a printed matter, method for removing a printing layer, method for producing a printed matter, and substrate.

<1>

A water-soluble resin for printing, including:
a monomer unit A having a sulfonate group; and
a monomer unit B having no hydrophilic group,
wherein a percentage of the monomer unit A based on a total of all monomer units is 5 to 35 mol %.

<2>

The water-soluble resin for printing according to <1>, wherein a counterion of a sulfonic acid group that constitutes the sulfonate group is preferably at least one selected from the group consisting of a metal ion and an ammonium ion, more preferably at least one selected from the group consisting of a metal ion, still more preferably at least one selected from the group consisting of an alkali metal ion and an alkaline earth metal ion, still more preferably at least one selected from the group consisting of an alkali metal ion, still more preferably one or two selected from the group consisting of a sodium ion and a potassium ion, and still more preferably a sodium ion.

<3>

The water-soluble resin for printing according to <1> or <2>, wherein a content of the sulfonate group in the water-soluble resin is preferably 0.4 mmol/g or more, more preferably 0.6 mmol/g or more, and still more preferably 0.7 mmol/g or more.

<4>

The water-soluble resin for printing according to <1> or <2>, wherein a content of the sulfonate group in the water-soluble resin is preferably 3 mmol/g or less, more preferably 2 mmol/g or less, and still more preferably 1.5 mmol/g or less.

<5>

The water-soluble resin for printing according to <1> or <2>, wherein a content of the sulfonate group in the water-soluble resin is preferably 0.4 to 3 mmol/g, more preferably 0.6 to 2 mmol/g, and still more preferably 0.7 to 1.5 mmol/g.

<6>

The water-soluble resin for printing according to any one of <1> to <5>, wherein a weight average molecular weight of the water-soluble resin is preferably 1000 or more, more preferably 3000 or more, and still more preferably 4000 or more.

<7>

The water-soluble resin for printing according to any one of <1> to <5>, wherein a weight average molecular weight of the water-soluble resin is preferably 80,000 or less, more preferably 50,000 or less, still more preferably 30,000 or less, and still more preferably 20,000 or less.

<8>

The water-soluble resin for printing according to any one of <1> to <5>, wherein a weight average molecular weight of the water-soluble resin is preferably 1000 to 80000, more preferably 3000 to 50000, still more preferably 4000 to 30000, and still more preferably 4000 to 20000.

<9>

The water-soluble resin for printing according to any one of <1> to <8>, wherein a percentage of the monomer unit A based on a total of all monomer units of the water-soluble resin is preferably 7 mol % or more, more preferably 10 mol % or more, and still more preferably 12 mol % or more.

<10>
The water-soluble resin for printing according to any one of <1> to <8>, wherein a percentage of the monomer unit A based on a total of all monomer units of the water-soluble resin is preferably 30 mol % or less, and more preferably 20 mol % or less.
<11>
The water-soluble resin for printing according to any one of <1> to <8>, wherein a percentage of the monomer unit A based on a total of all monomer units of the water-soluble resin is preferably 7 to 30 mol %, more preferably 10 to 20 mol %, and still more preferably 12 to 20 mol %.
<12>
The water-soluble resin for printing according to any one of <1> to <11>, wherein the monomer unit A is a dicarboxylic acid monomer unit A, and the monomer unit B is a dicarboxylic acid monomer unit B.
<13>
The water-soluble resin for printing according to <12>, wherein a monomer from which the dicarboxylic acid monomer unit A is derived is preferably at least one selected from the group consisting of a sulfonate group-containing aromatic dicarboxylic acid salt, more preferably at least one selected from the group consisting of sulfophthalic acid and sulfonaphthalenedicarboxylic acid, still more preferably at least one selected from the group consisting of sulfophthalic acid, still more preferably at least one selected from the group consisting of sulfoisophthalic acid and sulfoterephthalic acid, and still more preferably 5-sulfoisophthalic acid.
<14>
The water-soluble resin for printing according to <12> or <13>, wherein a monomer from which the dicarboxylic acid monomer unit B is derived is preferably at least one selected from the group consisting of an aromatic dicarboxylic acid having no hydrophilic group and the aliphatic dicarboxylic acid having no hydrophilic group, and more preferably at least one selected from the group consisting of the aromatic dicarboxylic acid having no hydrophilic group.
<15>
The water-soluble resin for printing according to <14>, wherein the aromatic dicarboxylic acid having no hydrophilic group is preferably at least one selected from the group consisting of terephthalic acid, isophthalic acid, 2,5-furandicarboxylic acid, and 2,6-naphthalenedicarboxylic acid, and more preferably at least one selected from the group consisting of terephthalic acid, isophthalic acid, and 2,6-naphthalenedicarboxylic acid.
<16>
The water-soluble resin for printing according to <14>, wherein the aliphatic dicarboxylic acid having no hydrophilic group is preferably at least one selected from the group consisting of malonic acid, succinic acid, glutaric acid, adipic acid, 1,4-cyclohexanedicarboxylic acid, and 1,3-adamantanedicarboxylic acid, and more preferably one or two selected from the group consisting of adipic acid and 1,4-cyclohexanedicarboxylic acid.
<17>
The water-soluble resin for printing according to any one of <12> to <16>, wherein a percentage of a total of an aromatic dicarboxylic acid based on a total of a dicarboxylic acid from which the dicarboxylic acid monomer unit B is derived is preferably 50 mol % or more, more preferably 60 mol % or more, and still more preferably 70 mol % or more.
<18>
The water-soluble resin for printing according to any one of <12> to <16>, wherein a percentage of a total of an aromatic dicarboxylic acid based on a total of a dicarboxylic acid from which the dicarboxylic acid monomer unit B is derived is preferably 100 mol % or less, more preferably 80 mol % or less, and still more preferably 70 mol % or less.
<19>
The water-soluble resin for printing according to any one of <12> to <18>, including a diol monomer unit C,
wherein a diol C from which the diol monomer unit C is derived has a carbon number of 2 or more.
<20>
The water-soluble resin for printing according to any one of <12> to <18>, including a diol monomer unit C,
wherein a diol C from which the diol monomer unit C is derived preferably has a carbon number of 31 or less, more preferably has a carbon number of 25 or less, still more preferably has a carbon number of 20 or less, and still more preferably has a carbon number of 15 or less.
<21>
The water-soluble resin for printing according to any one of <12> to <20>,
including a diol monomer unit C,
wherein the diol C is preferably an aliphatic diol, and more preferably at least one selected from the group consisting of a chain diol and a cyclic diol.
<22>
The water-soluble resin for printing according to <21>, wherein a percentage of a total of a cyclic diol based on a total of the diol C is preferably 1 mol % or more, more preferably 10 mol % or more, and still more preferably 40 mol % or more.
<23>
The water-soluble resin for printing according to <21>, wherein a percentage of a total of a cyclic diol based on a total of the diol C is preferably 90 mol % or less, more preferably 70 mol % or less, and still more preferably 60 mol % or less.
<24>
The water-soluble resin for printing according to any one of <21> to <23>, wherein a carbon number of the chain diol is preferably 2 or more.
<25>
The water-soluble resin for printing according to any one of <21> to <23>, wherein a carbon number of the chain diol is preferably 20 or less, more preferably 15 or less, and still more preferably 6 or less.
<26>
The water-soluble resin for printing according to any one of <21> to <23>, wherein the chain diol is preferably at least one selected from the group consisting of ethylene glycol, 1,2-propanediol, 1,3-propanediol, 1,4-butanediol, 1,2-butanediol, 1,3-butanediol, neopentyl glycol, 1,5-pentanediol, 1,6-hexanediol, diethylene glycol, triethylene glycol, polyethylene glycol, dipropylene glycol, and polypyrene glycol, more preferably at least one selected from the group consisting of ethylene glycol, 1,2-propanediol, 1,3-propanediol, and triethylene glycol, and still more preferably at least one selected from the group consisting of ethylene glycol, 1,3-propanediol, and triethylene glycol.
<27>
The water-soluble resin for printing according to any one of <21> to <23>, wherein a carbon number of the cyclic diol is preferably 2 or more, more preferably 4 or more, and still more preferably 6 or more.
<28>
The water-soluble resin for printing according to any one of <21> to <23>, wherein a carbon number of the chain diol is preferably 31 or less, more preferably 25 or less, still more preferably 20 or less, still more preferably 12 or less, and still more preferably 8 or less.

<29>

The water-soluble resin for printing according to any one of <21> to <23>, wherein the chain diol is preferably at least one selected from the group consisting of 1,4-cyclohexanedimethanol, hydrogenated bisphenol A, isosorbide, bisphenoxyethanolfluorene, bisphenol fluorene, biscresoxyethanolfluorene, and biscresol fluorene, and more preferably one or two selected from the group consisting of 1,4-cyclohexanedimethanol and isosorbide.

<30>

A water-soluble resin composition for printing, including:
the water-soluble resin for printing according to any one of <1> to <29>.

<31>

The water-soluble resin composition for printing according to <30>, wherein a content of the water-soluble resin for printing according to any one of <1> to <29> is 30% by mass or more and 100% by mass or less.

<32>

A vehicle for a printing ink, including:
the water-soluble resin for printing according to any one of <1> to <29>.

<33>

An ink, including:
the water-soluble resin for printing according to any one of <1> to <29>.

<34>

A printed matter, including:
a water-soluble printing layer containing the water-soluble resin for printing according to any one of <1> to <29>.

<35>

A method for producing a printed matter, including:
a water-soluble printing layer forming step of forming a water-soluble printing layer containing the water-soluble resin for printing according to any one of <1> to <29> on a substrate.

<36>

A method for removing a printing layer, including:
a printing layer removing step of treating the printed matter according to <34> with neutral water at 30° C. or more to remove the water-soluble printing layer.

<37>

A water-soluble resin composition for a printing primer, including:
the water-soluble resin for printing according to any one of <1> to <29>.

<38>

A printed matter, including, in sequence:
a substrate;
a water-soluble printing primer layer containing the water-soluble resin for printing according to any one of <1> to <29>; and
a printing layer.

<39>

A method for producing a printed matter, including:
a water-soluble printing primer layer forming step of forming a water-soluble printing primer layer containing the water-soluble resin for printing according to any one of <1> to <29> on a substrate; and
a printing layer forming step of forming a printing layer on the water-soluble printing primer layer.

<40>

A method for removing a printing layer, including:
a printing layer removing step of treating the printed matter according to <38> with neutral water at 30° C. or more to remove the water-soluble printing primer layer and the printing layer.

<41>

A substrate from which the water-soluble printing primer layer and the printing layer have been removed by the method for removing a printing layer according to <40>.

EXAMPLES

The pressure is expressed in an absolute pressure. "Normal pressure" refers to 101.3 kPa.

<Synthesis Method>

A method for synthesizing water-soluble resin compositions 1 to 14 and an acrylic-styrene copolymer composition is described below. The percentage of the monomer unit A based on a total of all monomer units of the water-soluble resin, the weight average molecular weight of the water-soluble resin or the acrylic-styrene copolymer composition, and the content of the water-soluble resin or the acrylic-styrene copolymer composition in the composition calculated from the amount of raw materials added are shown in Table 1.

[Synthesis of Water-Soluble Resin Composition 1]

Into a 2 L stainless steel separable flask (with a K tube, a stirrer, a nitrogen inlet tube), 97.7 g of dimethyl 2,6-naphthalenedicarboxylate (manufactured by Tokyo Chemical Industry Co., Ltd., first class), 40.6 g of dimethyl sodium 5-sulfoisophthalate (manufactured by FUJIFILM Wako Pure Chemical Corporation), 76.7 g of ethylene glycol (manufactured by FUJIFILM Wako Pure Chemical Corporation, highest quality), 82 mg of titanium tetrabutoxide (manufactured by Tokyo Chemical Industry Co., Ltd., first class), and 506 mg of sodium acetate (manufactured by FUJIFILM Wako Pure Chemical Corporation, highest quality) were charged, the temperature of the surface of a mantle heater was raised from 140° C. to 260° C. over 1 hour with the mantle heater with stirring under normal pressure and a nitrogen atmosphere, and the mixture was stirred for 6.5 hours at the temperature to perform a transesterification reaction. Then, 6.89 g of tetrabutylphosphonium dodecylbenzenesulfonate (manufactured by TAKEMOTO OIL & FAT Co., Ltd., ELECUT S-418) was added thereto, and the resulting mixture was stirred for 15 minutes. Then, the temperature of the surface of the heater was raised from 260 to 290° C. over 30 minutes, and at the same time, the pressure was reduced from normal pressure to 5.3 kPa to perform a reaction for 1.5 hours under the conditions. Then, a reaction was performed while stirring at 800 Pa for 30 minutes, then nitrogen was introduced into the stainless steel separable flask, and the pressure was returned to normal pressure. The temperature of the surface of the heater was raised from 290° C. to 295° C. at normal pressure over 15 minutes, then a reaction was performed with stirring at 420 Pa for 15 minutes, and then, a reaction was performed with stirring while gradually increasing the degree of pressure reduction from 470 Pa to 100 Pa over 15 minutes. Finally, nitrogen was introduced into the stainless steel separable flask, and the pressure was returned to normal pressure to obtain a water-soluble resin composition 1 containing a water-soluble polyester resin 1.

[Synthesis of Water-Soluble Resin Composition 2]

A water-soluble resin composition 2 containing a water-soluble polyester resin 2 was obtained by performing the same procedures as in the synthesis of the water-soluble resin composition 1 except that, after the temperature of the surface of the heater was maintained at 260° C. and the mixture was stirred for 6.5 hours to perform a transesterification reaction, the procedure of adding tetrabutylphosphonium dodecylbenzenesulfonate and stirring the resulting mixture for 15 minutes was not performed.

[Synthesis of Water-Soluble Resin Composition 3]

Into a 2 L stainless steel separable flask (with a K tube, a stirrer, a nitrogen inlet tube), 195.4 g of dimethyl 2,6-naphthalenedicarboxylate (manufactured by Tokyo Chemical Industry Co., Ltd.), 81.3 g of dimethyl sodium 5-sulfoisophthalate (manufactured by SANYO CHEMICAL INDUSTRIES, LTD.), 188.1 g of 1,3-propanediol (manufactured by Tokyo Chemical Industry Co., Ltd.), 0.16 g of titanium tetrabutoxide (manufactured by Tokyo Chemical Industry Co., Ltd.), and 0.41 g of sodium acetate (manufactured by FUJIFILM Wako Pure Chemical Corporation) were charged, the temperature of the surface of a mantle heater was raised from 160° C. to 260° C. over 50 minutes with stirring with the mantle heater under normal pressure and a nitrogen atmosphere, and the mixture was stirred at the temperature for 6.5 hours to perform a transesterification reaction. Then, the pressure was reduced from normal pressure to 1.5 kPa to perform a reaction for 1 hour, and then the pressure was reduced from 1.5 to 1.0 kPa to perform a reaction for 6 hours. Finally, nitrogen was introduced into the stainless steel separable flask, and the pressure was returned to normal pressure to obtain a water-soluble resin composition 3 containing a water-soluble polyester resin 3.

[Synthesis of Water-Soluble Resin Composition 4]

Into a 2 L stainless steel separable flask (with a K tube, a stirrer, a nitrogen inlet tube), 150.0 g of dimethyl terephthalate (manufactured by Tokyo Chemical Industry Co., Ltd.), 99.2 g of dimethyl sodium 5-sulfoisophthalate (manufactured by SANYO CHEMICAL INDUSTRIES, LTD.), 109.2 g of 1,4-cyclohexanedimethanol (manufactured by FUJIFILM Wako Pure Chemical Corporation, cis-trans mixture), 77.6 g of 1,3-propanediol (manufactured by Tokyo Chemical Industry Co., Ltd.), 158 mg of titanium tetrabutoxide (manufactured by Tokyo Chemical Industry Co., Ltd.), and 391 mg of sodium acetate (manufactured by FUJIFILM Wako Pure Chemical Corporation) were charged, the temperature of the surface of a mantle heater was raised from 160° C. to 260° C. over 50 minutes with the mantle heater with stirring under normal pressure and a nitrogen atmosphere, and the mixture was stirred for 6 hours at the temperature to perform a transesterification reaction. Then, the temperature of the surface of the heater was raised from 260 to 280° C. over 30 minutes, and at the same time, the pressure was reduced from normal pressure to 5.0 kPa to perform a reaction for 3 hours under the conditions. Then, the pressure was further reduced to 3.5 kPa while maintaining the temperature at 280° C. to perform a reaction for 1.5 hours, finally, nitrogen was introduced into the stainless steel separable flask, and the pressure was returned to normal pressure to obtain a water-soluble resin composition 4 containing a water-soluble polyester resin 4.

[Synthesis of Water-Soluble Resin Composition 5]

Into a 2 L stainless steel separable flask (with a K tube, a stirrer, a nitrogen inlet tube), 100.0 g of dimethyl terephthalate (manufactured by Tokyo Chemical Industry Co., Ltd.), 100.0 g of dimethyl isophthalate (manufactured by Tokyo Chemical Industry Co., Ltd.), 91.5 g of dimethyl sodium 5-sulfoisophthalate (manufactured by SANYO CHEMICAL INDUSTRIES, LTD.), 145.6 g of 1,4-cyclohexanedimethanol (manufactured by FUJIFILM Wako Pure Chemical Corporation, cis-trans mixture), 103.4 g of 1,3-propanediol (manufactured by Tokyo Chemical Industry Co., Ltd.), 210 mg of titanium tetrabutoxide (manufactured by Tokyo Chemical Industry Co., Ltd.), and 563 mg of sodium acetate (manufactured by FUJIFILM Wako Pure Chemical Corporation) were charged, the temperature of the surface of a mantle heater was raised from 160° C. to 220° C. over 25 minutes with the mantle heater with stirring under normal pressure and a nitrogen atmosphere, and the mixture was stirred for 6 hours at the temperature to perform a transesterification reaction. Then, the temperature of the surface of the heater was raised from 220 to 240° C. over 10 minutes, and at the same time, the pressure was reduced from normal pressure to 1.5 kPa to perform a reaction for 8 hours under the conditions. Then, the pressure was further reduced to 0.3 kPa while maintaining the temperature at 240° C. to perform a reaction for 5.5 hours, finally, nitrogen was introduced into the stainless steel separable flask, and the pressure was returned to normal pressure to obtain a water-soluble resin composition 5 containing a water-soluble polyester resin 5.

[Synthesis of Water-Soluble Resin Composition 6]

Into a 2 L stainless steel separable flask (with a K tube, a stirrer, a nitrogen inlet tube), 100.0 g of dimethyl terephthalate (manufactured by Tokyo Chemical Industry Co., Ltd.), 100.0 g of dimethyl isophthalate (manufactured by Tokyo Chemical Industry Co., Ltd.), 45.8 g of dimethyl sodium 5-sulfoisophthalate (manufactured by SANYO CHEMICAL INDUSTRIES, LTD.), 128.8 g of 1,4-cyclohexanedimethanol (manufactured by FUJIFILM Wako Pure Chemical Corporation, cis-trans mixture), 91.5 g of 1,3-propanediol (manufactured by Tokyo Chemical Industry Co., Ltd.), 210 mg of titanium tetrabutoxide (manufactured by Tokyo Chemical Industry Co., Ltd.), and 563 mg of sodium acetate (manufactured by FUJIFILM Wako Pure Chemical Corporation) were charged, the temperature of the surface of a mantle heater was raised from 160° C. to 220° C. over 25 minutes with the mantle heater with stirring under normal pressure and a nitrogen atmosphere, and the mixture was stirred for 6 hours at the temperature to perform a transesterification reaction. Then, the temperature of the surface of the heater was raised from 220 to 240° C. over 20 minutes. Then, the pressure was reduced from normal pressure to 1.0 kPa over 50 minutes to perform a reaction for 10.5 hours under the conditions, and finally the pressure was returned to normal pressure to obtain a water-soluble resin composition 6 containing a water-soluble polyester resin 6.

[Synthesis of Water-Soluble Resin Composition 7]

Into a 2 L stainless steel separable flask (with a K tube, a stirrer, a nitrogen inlet tube), 150.0 g of dimethyl terephthalate (manufactured by Tokyo Chemical Industry Co., Ltd.), 99.2 g of dimethyl sodium 5-sulfoisophthalate (manufactured by SANYO CHEMICAL INDUSTRIES, LTD.), 109.2 g of 1,4-cyclohexanedimethanol (manufactured by FUJIFILM Wako Pure Chemical Corporation, cis-trans mixture), 77.6 g of 1,3-propanediol (manufactured by Tokyo Chemical Industry Co., Ltd.), 16.6 g of tetrabutylphosphonium dodecylbenzenesulfonate (manufactured by TAKEMOTO OIL & FAT Co., Ltd., ELECUT S-418), 158 mg of titanium tetrabutoxide (manufactured by Tokyo Chemical Industry Co., Ltd.), and 391 mg of sodium acetate (manufactured by FUJIFILM Wako Pure Chemical Corporation) were charged, the temperature of the surface of a mantle heater was raised from 160° C. to 260° C. over 50 minutes with the mantle heater with stirring under normal pressure and a nitrogen atmosphere, and the mixture was stirred for 6 hours at the temperature to perform a transesterification reaction. Then, the temperature of the surface of the heater was raised from 260 to 280° C. over 30 minutes, and at the same time, the pressure was reduced from normal pressure to 5.0 kPa to perform a reaction for 5.5 hours under the conditions. Finally, nitrogen was introduced into the stainless steel separable flask, and the pressure was returned to normal pressure to obtain a water-soluble resin composition 7 containing a water-soluble polyester resin 7.

[Synthesis of Water-Soluble Resin Composition 8]

Into a 2 L stainless steel separable flask (with a K tube, a stirrer, a nitrogen inlet tube), 160.0 g of dimethyl terephthalate (manufactured by Tokyo Chemical Industry Co., Ltd.), 73.2 g of dimethyl sodium 5-sulfoisophthalate (manufactured by SANYO CHEMICAL INDUSTRIES, LTD.), 116.4 g of 1,4-cyclohexanedimethanol (manufactured by FUJIFILM Wako Pure Chemical Corporation, cis-trans mixture), 43.9 g of 1,3-propanediol (manufactured by Tokyo Chemical Industry Co., Ltd.), 36.4 g of triethylene glycol (manufactured by Tokyo Chemical Industry Co., Ltd.), 16.8 g of tetrabutylphosphonium dodecylbenzenesulfonate (manufactured by TAKEMOTO OIL & FAT Co., Ltd., ELECUT S-418), 168 mg of titanium tetrabutoxide (manufactured by Tokyo Chemical Industry Co., Ltd.), and 417 mg of sodium acetate (manufactured by FUJIFILM Wako Pure Chemical Corporation) were charged, the temperature of the surface of a mantle heater was raised from 160° C. to 230° C. over 35 minutes with the mantle heater with stirring under normal pressure and a nitrogen atmosphere, and the mixture was stirred for 6.5 hours at the temperature to perform a transesterification reaction. Then, the temperature of the surface of the heater was raised from 230 to 250° C. over 10 minutes, and at the same time, the pressure was reduced from normal pressure to 3.0 kPa to perform a reaction for 4.5 hours under the conditions. Finally, nitrogen was introduced into the stainless steel separable flask, and the pressure was returned to normal pressure to obtain a water-soluble resin composition 8 containing a water-soluble polyester resin 8.

[Synthesis of Water-Soluble Resin Composition 9]

Into a 2 L stainless steel separable flask (with a K tube, a stirrer, a nitrogen inlet tube), 200.0 g of dimethyl terephthalate (manufactured by Tokyo Chemical Industry Co., Ltd.), 91.5 g of dimethyl sodium 5-sulfoisophthalate (manufactured by SANYO CHEMICAL INDUSTRIES, LTD.), 101.0 g of 1,4-cyclohexanedimethanol (manufactured by FUJIFILM Wako Pure Chemical Corporation, cis-trans mixture), 105.5 g of 1,3-propanediol (manufactured by Tokyo Chemical Industry Co., Ltd.), 45.2 g of isosorbide (manufactured by Tokyo Chemical Industry Co., Ltd.), 21.1 g of tetrabutylphosphonium dodecylbenzenesulfonate (manufactured by TAKEMOTO OIL & FAT Co., Ltd., ELECUT S-418), 210 mg of titanium tetrabutoxide (manufactured by Tokyo Chemical Industry Co., Ltd.), and 521 mg of sodium acetate (manufactured by FUJIFILM Wako Pure Chemical Corporation) were charged, the temperature of the surface of a mantle heater was raised from 160° C. to 220° C. over 30 minutes with the mantle heater with stirring under normal pressure and a nitrogen atmosphere, and the mixture was stirred for 6.5 hours at the temperature to perform a transesterification reaction. Then, the temperature of the surface of the heater was raised from 220 to 240° C. over 10 minutes, and at the same time, the pressure was reduced from normal pressure to 3.0 kPa to perform a reaction for 2 hours under the conditions. Then, the pressure was reduced from 3.0 to 2.0 kPa to perform a reaction for 5 hour, and then the pressure was reduced from 2.0 to 1.0 kPa to perform a reaction for 2.5 hours. Finally, nitrogen was introduced into the stainless steel separable flask, and the pressure was returned to normal pressure to obtain a water-soluble resin composition 9 containing a water-soluble polyester resin 9.

[Synthesis of Water-Soluble Resin Composition 10]

Into a 2 L stainless steel separable flask (with a K tube, a stirrer, a nitrogen inlet tube), 200.0 g of dimethyl terephthalate (manufactured by Tokyo Chemical Industry Co., Ltd.), 132.1 g of dimethyl sodium 5-sulfoisophthalate (manufactured by SANYO CHEMICAL INDUSTRIES, LTD.), 133.7 g of 1,4-cyclohexanedimethanol (manufactured by FUJIFILM Wako Pure Chemical Corporation, cis-trans mixture), 78.4 g of 1,3-propanediol (manufactured by Tokyo Chemical Industry Co., Ltd.), 45.2 g of isosorbide (manufactured by Tokyo Chemical Industry Co., Ltd.), 24.2 g of tetrabutylphosphonium dodecylbenzenesulfonate (manufactured by TAKEMOTO OIL & FAT Co., Ltd., ELECUT S-418), 210 mg of titanium tetrabutoxide (manufactured by Tokyo Chemical Industry Co., Ltd.), and 521 mg of sodium acetate (manufactured by FUJIFILM Wako Pure Chemical Corporation) were charged, the temperature of the surface of a mantle heater was raised from 160° C. to 220° C. over 30 minutes with the mantle heater with stirring under normal pressure and a nitrogen atmosphere, and the mixture was stirred for 6 hours at the temperature to perform a transesterification reaction. Then, the temperature of the surface of the heater was raised from 220 to 240° C. over 10 minutes, the mixture was stirred for 20 minutes, then the pressure was reduced from normal pressure to 1.0 kPa to perform a reaction for 6.5 hours under the conditions. Finally, nitrogen was introduced into the stainless steel separable flask, and the pressure was returned to normal pressure to obtain a water-soluble resin composition 10 containing a water-soluble polyester resin 10.

[Synthesis of Water-Soluble Resin Composition 11]

Into a 2 L stainless steel separable flask (with a K tube, a stirrer, a nitrogen inlet tube), 100.0 g of dimethyl terephthalate (manufactured by Tokyo Chemical Industry Co., Ltd.), 98.6 g of dimethyl 1,4-cyclohexanedicarboxylate (manufactured by FUJIFILM Wako Pure Chemical Corporation, cis-trans mixture), 91.6 g of dimethyl sodium 5-sulfoisophthalate (manufactured by SANYO CHEMICAL INDUSTRIES, LTD.), 146.0 g of 1,4-cyclohexanedimethanol (manufactured by FUJIFILM Wako Pure Chemical Corporation, cis-trans mixture), 104.5 g of 1,3-propanediol (manufactured by Tokyo Chemical Industry Co., Ltd.), 19.8 g of tetrabutylphosphonium dodecylbenzenesulfonate (manufactured by TAKEMOTO OIL & FAT Co., Ltd., ELECUT S-418), 210 mg of titanium tetrabutoxide (manufactured by Tokyo Chemical Industry Co., Ltd.), and 563 mg of sodium acetate (manufactured by FUJIFILM Wako Pure Chemical Corporation) were charged, the temperature of the surface of a mantle heater was raised from 160° C. to 220° C. over 25 minutes with the mantle heater with stirring under normal pressure and a nitrogen atmosphere, and the mixture was stirred for 6 hours at the temperature to perform a transesterification reaction. Then, the temperature of the surface of the heater was raised from 220 to 240° C. over 10 minutes, and at the same time, the pressure was reduced from normal pressure to 1.5 kPa to perform a reaction for 3.5 hours under the conditions. Then, the pressure was further reduced to 0.3 kPa while maintaining the temperature at 240° C. to perform a reaction for 5.5 hours, finally, nitrogen was introduced into the stainless steel separable flask, and the pressure was returned to normal pressure to obtain a water-soluble resin composition 11 containing a water-soluble polyester resin 11.

[Synthesis of Water-Soluble Resin Composition 12]

Into a 2 L stainless steel separable flask (with a K tube, a stirrer, a nitrogen inlet tube), 100.0 g of dimethyl terephthalate (manufactured by Tokyo Chemical Industry Co., Ltd.), 105.7 g of dimethyl adipate (manufactured by Tokyo Chemical Industry Co., Ltd.), 91.6 g of dimethyl sodium 5-sulfoisophthalate (manufactured by SANYO CHEMICAL INDUSTRIES, LTD.), 146.0 g of 1,4-cyclohexanedimethanol (manufactured by FUJIFILM Wako Pure Chemical Corporation, cis-trans mixture), 104.5 g of 1,3-propanediol (manufactured by Tokyo Chemical Industry Co., Ltd.), 20.2 g of tetrabutylphosphonium dodecylbenzenesulfonate (manufactured by TAKEMOTO OIL & FAT Co., Ltd., ELECUT S-418), 210 mg of titanium tetrabutoxide (manufactured by Tokyo Chemical Industry Co., Ltd.), and 563 mg of sodium acetate (manufactured by FUJIFILM Wako Pure Chemical Corporation) were charged, the temperature of the surface of a mantle heater was raised from 160° C. to 220° C. over 25 minutes with the mantle heater with stirring under normal pressure and a nitrogen atmosphere, and the mixture was stirred for 6 hours at the temperature to perform a transesterification reaction. Then, the temperature of the surface of the heater was raised from 220 to 240° C. over 10 minutes, and at the same time, the pressure was reduced from normal pressure to 2.0 kPa to perform a reaction for 5 hours under the conditions. Then, the pressure was further reduced to 0.4 kPa while maintaining the temperature at 240° C. to perform a reaction for 12 hours, finally, nitrogen was introduced into the stainless steel separable flask, and the pressure was returned to normal pressure to obtain a water-soluble resin composition 12 containing a water-soluble polyester resin 12.

[Synthesis of Water-Soluble Resin Composition 13]

The same synthesis as the synthesis of the water-soluble resin composition 5 was performed except that into a 2 L stainless steel separable flask (with a K tube, a stirrer, a nitrogen inlet tube), in addition to 100.0 g of dimethyl terephthalate (manufactured by Tokyo Chemical Industry Co., Ltd.), 100.0 g of dimethyl isophthalate (manufactured by Tokyo Chemical Industry Co., Ltd.), 91.5 g of dimethyl sodium 5-sulfoisophthalate (manufactured by SANYO CHEMICAL INDUSTRIES, LTD.), 145.6 g of 1,4-cyclohexanedimethanol (manufactured by FUJIFILM Wako Pure Chemical Corporation, cis-trans mixture), 103.4 g of 1,3-propanediol (manufactured by Tokyo Chemical Industry Co., Ltd.), 210 mg of titanium tetrabutoxide (manufactured by Tokyo Chemical Industry Co., Ltd.), and 563 mg of sodium acetate (manufactured by FUJIFILM Wako Pure Chemical Corporation), 21.6 g of tetrabutylphosphonium dodecylbenzenesulfonate (manufactured by TAKEMOTO OIL & FAT Co., Ltd., ELECUT S-418) was charged to obtain a water-soluble resin composition 13 containing a water-soluble polyester resin 13.

[Synthesis of Water-Soluble Resin Composition 14]

Into a 2 L stainless steel separable flask (with a K tube, a stirrer, a nitrogen inlet tube), 97.7 g of dimethyl 2,6-naphthalenedicarboxylate (manufactured by Tokyo Chemical Industry Co., Ltd., first class), 40.6 g of dimethyl sodium 5-sulfoisophthalate (manufactured by FUJIFILM Wako Pure Chemical Corporation), 76.7 g of ethylene glycol (manufactured by FUJIFILM Wako Pure Chemical Corporation, highest quality), 82 mg of titanium tetrabutoxide (manufactured by Tokyo Chemical Industry Co., Ltd., first class), and 506 mg of sodium acetate (manufactured by FUJIFILM Wako Pure Chemical Corporation, highest quality) were charged, the temperature of the surface of a mantle heater was raised from 140° C. to 260° C. over 1 hour with the mantle heater with stirring under normal pressure and a nitrogen atmosphere, and the mixture was stirred for 6.5 hours at the temperature to perform a transesterification reaction. Then, 6.89 g of tetrabutylphosphonium dodecylbenzenesulfonate (manufactured by TAKEMOTO OIL & FAT Co., Ltd., ELECUT S-418) was added thereto, and the resulting mixture was stirred for 15 minutes. Then, the temperature of the surface of the heater was raised from 260 to 290° C. over 30 minutes, and at the same time, the pressure was reduced from normal pressure to 5.3 kPa to perform a reaction for 1 hour and a half under the conditions. Then, a reaction was performed while stirring at 800 Pa for 30 minutes, then nitrogen was introduced into the stainless steel separable flask, and the pressure was returned to normal pressure. The temperature of the surface of the heater was raised from 290° C. to 295° C. at normal pressure over 15 minutes, then a reaction was performed with stirring at 420 Pa for 15 minutes, and then, a reaction was performed with stirring while gradually increasing the degree of pressure reduction from 470 Pa to 100 Pa over 15 minutes. Finally, nitrogen was introduced into the stainless steel separable flask, and the pressure was returned to normal pressure to obtain a water-soluble resin composition 14 containing a water-soluble polyester resin 14.

[Synthesis of Water-Soluble Resin Composition 15]

Into a 2 L stainless steel separable flask (with a K tube, a stirrer, a nitrogen inlet tube), 182.3 g of dimethyl 2,6-naphthalenedicarboxylate (manufactured by Tokyo Chemical Industry Co., Ltd., first class), 80.0 g of dimethyl terephthalate (manufactured by Tokyo Chemical Industry Co., Ltd., first class), 25.7 g of dimethyl sodium 5-sulfoisophthalate (manufactured by FUJIFILM Wako Pure Chemical Corporation), 185.7 g of ethylene glycol (manufactured by FUJIFILM Wako Pure Chemical Corporation, highest quality), 379 mg of magnesium acetate (manufactured by FUJIFILM Wako Pure Chemical Corporation) were charged, the temperature of the surface of a mantle heater was raised from 160° C. to 240° C. over 40 minutes with the mantle heater with stirring under normal pressure and a nitrogen atmosphere, and the mixture was stirred for 6.5 hours at the temperature to perform a transesterification reaction. Then, 237 mg of antimony trioxide (manufactured by FUJIFILM Wako Pure Chemical Corporation), 142 mg of triethyl phosphate (manufactured by FUJIFILM Wako Pure Chemical Corporation), and 332 mg of silica gel were added, and the temperature of the surface of the heater was raised from 240° C. to 285° C. over 30 minutes, and at the same time, the pressure was reduced from normal pressure to 500 to 600 Pa to perform a reaction for 6 hours under the conditions. Finally, nitrogen was introduced into the stainless steel separable flask, and the pressure was returned to normal pressure to obtain a water-soluble resin composition 15 containing a water-soluble polyester resin 15.

[Synthesis of Acrylic-Styrene Copolymer Composition]

Into a reaction vessel, 70 parts by mass of styrene (manufactured by FUJIFILM Wako Pure Chemical Corporation), 30 parts by mass of acrylic acid (manufactured by FUJIFILM Wako Pure Chemical Corporation), 150 parts by mass of ethyl acetate (manufactured by FUJIFILM Wako Pure Chemical Corporation), 150 parts by mass of isopropyl alcohol (manufactured by FUJIFILM Wako Pure Chemical Corporation), and 1.2 parts by mass of azobisisobutyronitrile (manufactured by FUJIFILM Wako Pure Chemical Corporation) were added, mixed, and polymerized at 70° C. for 8 hours under a nitrogen gas atmosphere to obtain an acrylic-styrene copolymer composition containing an acrylic-styrene copolymer. The percentage of the amount of substance of the monomer unit A based on a total of the amount of substance of all monomer units in the copolymer was calculated from the amount of the raw materials added.

<Evaluation Method>

[Percentage of Amount of Substance of Monomer Unit (Monomer Unit A) Derived from Dimethyl Sodium 5-Sulfoisophthalate Based on Total of Amount of Substance of all Monomer Units in Water-Soluble Polyester Resin]

A sample was dissolved in a mixed solvent of deuterated chloroform and deuterated trifluoroacetic acid, and an amount of substance A obtained by dividing an integral value A of a peak derived from a benzene ring in a monomer unit (monomer unit A) derived from dimethyl sodium 5-sulfoisophthalate by the number of protons corresponding to the benzene ring in the monomer unit A and an amount of substance B obtained by dividing an integral value B of a peak derived from a benzene ring in a monomer unit (monomer unit B) derived from dimethyl terephthalate, dimethyl isophthalate, or both of them by the number of protons corresponding to the benzene ring in the monomer unit B were calculated by proton NMR measurement using NMR MR400 manufactured by Agilent. The value obtained by dividing the amount of substance A by 2 times the sum of the amount of substance A and the amount of substance B, expressed in percentage (100×amount of substance A/(2× (amount of substance A+amount of substance B)), was defined as the percentage of the amount of substance of the monomer unit A based on a total of the amount of substance of all monomer units in the water-soluble polyester resin.

However, when the monomer unit B is a monomer unit derived from cyclohexane or adipic acid, the percentage of the amount of substance of the monomer unit (monomer unit A) derived from dimethyl sodium 5-sulfoisophthalate based on a total of the amount of substance of all monomer units in the water-soluble polyester resin was determined by the following method.

A sample was dissolved in a mixed solvent of deuterated chloroform and deuterated trifluoroacetic acid, and an amount of substance A obtained by dividing an integral value A of a peak derived from a benzene ring in a monomer unit (monomer unit A) derived from dimethyl sodium 5-sulfoisophthalate by the number of protons corresponding to the benzene ring in the monomer unit A, an amount of substance B obtained by dividing an integral value B of a peak derived from a benzene ring in a monomer unit (monomer unit B) derived from dimethyl terephthalate, dimethyl isophthalate, or both of them by the number of protons corresponding to the benzene ring in the monomer unit B, and an amount of substance C obtained by dividing an integral value C of a peak corresponding to carbonyl α-position in monomer unit (monomer unit C) derived from aliphatic dimethyl carboxylate by the number of protons corresponding to vicinity of ester in the monomer unit C were calculated by proton NMR measurement using NMR MR400 manufactured by Agilent. The value obtained by dividing the amount of substance A by 2 times the sum of the amount of substance A, the amount of substance B, and the amount of substance C expressed in percentage (100× amount of substance A/(2×(amount of substance A+amount of substance B+amount of substance C)), was defined as the percentage of the amount of substance of the monomer unit A based on a total of the amount of substance of all monomer units in the water-soluble polyester resin.

[Weight Average Molecular Weight (Mw)]

A calibration curve was prepared from standard polystyrene or standard polymethyl methacrylate using a gel permeation chromatograph (GPC) method under the following conditions to determine the weight average molecular weight (Mw).

(Measurement condition 1: Water-Soluble Polyester Resins 1 to 7 and 9 to 14, Acrylic-Styrene Copolymer)
  Apparatus: HLC-8320 GPC (Detector integrated type, manufactured by TOSOH CORPORATION)
  Column: α-M×2 columns (7.8 mmI.D.×30 cm, manufactured by TOSOH CORPORATION)
  Eluent: 60 mmol/L phosphoric acid+50 mmol/L brominated lithium dimethylformamide solution
  Flow rate: 1.0 mL/min
  Column temperature: 40° C.
  Detector: RI detector
  Standard substance: polystyrene (Measurement Condition 2: Water-Soluble Polyester Resin 8)
  Apparatus: HLC-8320 GPC (Detector integrated type, manufactured by TOSOH CORPORATION)
  Column: TSK-Gel Super AWM-H (manufactured by TOSOH CORPORATION)
  Eluent: HFIP/0.5 mM sodium trifluoroacetate
  Flow rate: 0.2 mL/min
  Column temperature: 40° C.
  Detector: RI detector
  Standard substance: polymethyl methacrylate (PMMA)

(Measurement Condition 3: Water-Soluble Polyester Resin 15)
  Apparatus: HLC-8320 GPC (Detector integrated type, manufactured by TOSOH CORPORATION)
  Column: Shodex GPCHFIP-604, Shodex GPCHFIP-605 (manufactured by SHOWA DENKO K.K.)
  Eluent: HFIP/0.5 mM sodium trifluoroacetate
  Flow rate: 0.2 mL/min
  Column temperature: 40° C.
  Detector: RI detector
  Standard substance: polymethyl methacrylate (PMMA)

[Glass Transition Temperature]

A sample sandwiched between polyimide films was placed on a hot plate heated to 260° C., and a spatula was pressed from above to prepare a sheet having a thickness of about 0.2 mm. A sample (5 to 10 mg) was cut out from the sheet with scissors, precisely weighed, and sealed in an aluminum pan, the temperature was raised from 30° C. to 250° C. at 10° C./min, and then the sample was cooled at a set temperature of 30° C. using a DSC apparatus (DSC 7020 manufactured by Seiko Instruments Inc.). The glass transition temperature (° C.) of each resin composition was determined from the DSC curve obtained by raising the temperature again to 250° C. at 10° C./min.

<Evaluation of Primer Layer>

[Preparation of Sample]

Examples 1 to 10 and 22 to 23, Comparative Examples 1 to 4

Aqueous solutions of 20% by mass of the water-soluble resin compositions described in Tables 1 and 2 and 80% by mass of deionized water were applied onto substrate films described in Tables 1 and 2 using a bar coater, and dried by heating at 90° C. for 5 minutes to form a printing primer layer. Further, on the printing primer layer, printing was performed with a tabletop gravure printing machine (manufactured by Matsuo Sangyo Co., Ltd., K-printing proofer) using an oil gravure ink (PANNECO AM manufactured by TOYO INK CO., LTD.) whose viscosity is adjusted to 15 seconds with a diluent (PN 102 solvent manufactured by TOYO INK CO., LTD.) using a Zahn cup #3 to prepare a sample. The water-soluble resin composition 16 in Tables 1 and 2 is polyvinyl alcohol (PVA-424H manufactured by KURARAY CO., LTD.).

Examples 11 to 21 and 24 to 34

Samples were prepared in the same procedure as in Example 1 except that aqueous solutions of 10% by mass of the water-soluble resin composition described in Tables 1 and 2 and 90% by mass of deionized water were used.

The substrates described in Tables 1 and 2 are as follows.
PET: biaxial oriented polyethylene terephthalate (manufactured by FUTAMURA CHEMICAL CO., LTD.)
OPP: biaxial oriented polypropylene (manufactured by TOYOBO CO., LTD.)
ONy: biaxial oriented nylon (manufactured by PANAC Corporation)
HDPE: high density polyethylene (manufactured by TAMAPOLY CO., LTD.)
LLDPE: linear low density polyethylene (manufactured by Okura Industrial Co., Ltd.)

[Method for Detachment Test of Printed Matter]

Each of the prepared samples was immersed in tap water at a temperature described in Table 1, and the detachment state of the printing primer layer having a printed matter was observed while stirring. When the printed matter spontaneously dropped from the substrate film almost completely within 10 minutes, the time (minutes) was described.

[Removal Percentage (Hot Water Solubility Test)]

Each of the prepared samples was immersed in 200 mL of tap water at a temperature described in Table 1 and stirred for 10 minutes, and then each sample was dried with hot air at 80° C. for 1 hour. The removal percentage of the printed matter was measured from the area ratio of the printed matter obtained by measuring the areas of the printed matter before immersion in tap water and after drying. For the measurement of the area of the printed matter, an image was captured using a scanner function in which the image quality was set to 200 dpi using a digital full-color multifunction printer MP C5504 manufactured by Ricoh Co., Ltd., and the area of the printed matter was measured using an image obtained by binarizing the scanned image with the threshold value set to 236 using an image processing software "WinRoof" manufactured by MITANI CORPORATION. The removal percentage was calculated using the following formula.

Removal percentage (%)={$(M-M')/M$}×100

M: Area of printed matter before immersion in tap water
M': Area of printed matter after drying

[Water Resistance Test]

Each sample was immersed in tap water at 25° C. for 24 hours, and then the presence or absence of lifting of the detachment layer having the printed matter on the surface of the substrate film and the tendency of detachment due to scratching with a spatula were observed. The results were evaluated by the following indices.

3: The detachment layer having a printed matter is not lifted, and the printed matter is hardly detached.
2: The detachment layer having a printed matter is not lifted, but the printed matter is slightly easily detached.
1: The detachment layer having a printed matter is lifted, and the printed matter is easily detached with a light force.

The evaluation results are shown in Tables 1 and 2.

TABLE 1

| | | Resin composition | | | | |
|---|---|---|---|---|---|---|
| | | Water-soluble resin | | | | |
| | Type | Content (% by mass) | Type | Percentage of monomer unit A (mol %) | Weight average molecular weight (Mw) | Glass transition temperature (° C.) |
| Example 1 | Water-soluble resin composition 1 | 95.2 | Water-soluble polyester resin 1 | 12.5 | 18800 | 109 |
| Example 2 | Water-soluble resin composition 1 | 95.2 | Water-soluble polyester resin 1 | 12.5 | 18800 | 109 |
| Example 3 | Water-soluble resin composition 1 | 95.2 | Water-soluble polyester resin 1 | 12.5 | 18800 | 109 |
| Example 4 | Water-soluble resin composition 1 | 95.2 | Water-soluble polyester resin 1 | 12.5 | 18800 | 109 |
| Example 5 | Water-soluble resin composition 1 | 95.2 | Water-soluble polyester resin 1 | 12.5 | 18800 | 109 |
| Example 6 | Water-soluble resin composition 1 | 95.2 | Water-soluble polyester resin 1 | 12.5 | 18800 | 109 |
| Example 7 | Water-soluble resin composition 1 | 95.2 | Water-soluble polyester resin 1 | 12.5 | 18800 | 109 |
| Example 8 | Water-soluble resin composition 2 | 100 | Water-soluble polyester resin 2 | 12.5 | 17800 | 109 |
| Example 9 | Water-soluble resin composition 2 | 100 | Water-soluble polyester resin 2 | 12.5 | 17800 | 109 |
| Example 10 | Water-soluble resin composition 2 | 100 | Water-soluble polyester resin 2 | 12.5 | 17800 | 109 |
| Example 11 | Water-soluble resin composition 3 | 100 | Water-soluble polyester resin 3 | 12.5 | 4600 | 74 |
| Example 12 | Water-soluble resin composition 4 | 100 | Water-soluble polyester resin 4 | 15.2 | 3800 | 56 |
| Example 13 | Water-soluble resin composition 5 | 100 | Water-soluble polyester resin 5 | 11.5 | 11,400 | 72 |
| Example 14 | Water-soluble resin composition 6 | 100 | Water-soluble polyester resin 6 | 6.5 | 9,700 | 64 |

TABLE 1-continued

| | | | | | | | Evaluation | | |
|---|---|---|---|---|---|---|---|---|---|
| | | | | | | Substrate | Layer configuration of printed matter | Water temperature when dissolved (° C.) | Detachment time (min) | Removal percentage (%) |

| | | | | | | |
|---|---|---|---|---|---|---|
| Example 15 | Water-soluble composition 7 | 95.2 | Water-soluble polyester resin 7 | 15.2 | 14000 | 92 |
| Example 16 | Water-soluble composition 8 | 95.2 | Water-soluble polyester resin 8 | 13.3 | 4000 | 77 |
| Example 17 | Water-soluble composition 9 | 95.2 | Water-soluble polyester resin 9 | 11.7 | 4800 | 52 |
| Example 18 | Water-soluble composition 10 | 95.2 | Water-soluble polyester resin 10 | 15.4 | 6000 | 87 |
| Example 19 | Water-soluble composition 11 | 95.2 | Water-soluble polyester resin 11 | 10.3 | 11900 | 64 |
| Example 20 | Water-soluble composition 12 | 95.2 | Water-soluble polyester resin 12 | 10.6 | 17300 | 29 |
| Example 21 | Water-soluble composition 13 | 95.2 | Water-soluble polyester resin 13 | 11.5 | 11200 | 71 |
| Comparative Example 1 | Water-soluble composition 15 | 100 | Water-soluble polyester resin 15 | 3.50 | 5000 | 100 |
| Comparative Example 2 | Acrylic-styrene copolymer resin composition | 100 | Acrylic-styrene copolymer | 38.2 | 58700 | 140 |
| Comparative Example 3 | Water-soluble resin composition 16 | 100 | Polyvinyl alcohol | — | — | — |

| | Substrate | Layer configuration of printed matter | Water temperature when dissolved (° C.) | Detachment time (min) | Removal percentage (%) |
|---|---|---|---|---|---|
| Example 1 | PET | Substrate/primer layer/printing layer | 70 | 4 | 100 |
| Example 2 | PP | Substrate/primer layer/printing layer | 70 | 10 | 93 |
| Example 3 | Ny | Substrate/primer layer/printing layer | 70 | 4 | 100 |
| Example 4 | HDPE | Substrate/primer layer/printing layer | 70 | 10 | 80 |
| Example 5 | LLDPE | Substrate/primer layer/printing layer | 70 | 10 | 70 |
| Example 6 | PET | Substrate/primer layer/printing layer | 50 | 10 | 79 |
| Example 7 | PET | Substrate/primer layer/printing layer | 40 | 10 | 52 |
| Example 8 | PET | Substrate/primer layer/printing layer | 70 | 5 | 100 |
| Example 9 | PET | Substrate/primer layer/printing layer | 50 | 10 | 79 |
| Example 10 | PET | Substrate/primer layer/printing layer | 40 | 10 | 68 |
| Example 11 | PET | Substrate/primer layer/printing layer | 70 | 1 | 100 |
| Example 12 | PET | Substrate/primer layer/printing layer | 70 | 0.5 | 100 |
| Example 13 | PET | Substrate/primer layer/printing layer | 70 | 10 | 100 |
| Example 14 | PET | Substrate/primer layer/printing layer | 70 | 10 | 90 |
| Example 15 | PET | Substrate/primer layer/printing layer | 70 | 1.5 | 100 |
| Example 16 | PET | Substrate/primer layer/printing layer | 70 | 0.1 | 100 |
| Example 17 | PET | Substrate/primer layer/printing layer | 70 | 0.3 | 100 |
| Example 18 | PET | Substrate/primer layer/printing layer | 70 | 0.1 | 100 |
| Example 19 | PET | Substrate/primer layer/printing layer | 70 | 2.5 | 100 |
| Example 20 | PET | Substrate/primer layer/printing layer | 70 | 1.7 | 100 |
| Example 21 | PET | Substrate/primer layer/printing layer | 70 | 1.5 | 100 |
| Comparative Example 1 | PET | Substrate/primer layer/printing layer | 70 | 10 | 1 |
| Comparative Example 2 | PET | Substrate/primer layer/printing layer | 70 | 10 | 0 |
| Comparative Example 3 | PET | Substrate/primer layer/printing layer | 70 | 10 | 53 |

TABLE 2

| | Water-soluble resin composition Type | Substrate | Layer configuration of printed matter | Evaluation Water resistance test |
|---|---|---|---|---|
| Example 22 | Water-soluble resin composition 1 | PET | Substrate/primer layer/printing layer | 3 |
| Example 23 | Water-soluble resin composition 2 | PET | Substrate/primer layer/printing layer | 3 |
| Example 24 | Water-soluble resin composition 3 | PET | Substrate/primer layer/printing layer | 2 |
| Example 25 | Water-soluble resin composition 4 | PET | Substrate/primer layer/printing layer | 2 |
| Example 26 | Water-soluble resin composition 5 | PET | Substrate/primer layer/printing layer | 3 |
| Example 27 | Water-soluble resin composition 6 | PET | Substrate/primer layer/printing layer | 3 |
| Example 28 | Water-soluble resin composition 7 | PET | Substrate/primer layer/printing layer | 3 |
| Example 29 | Water-soluble resin composition 8 | PET | Substrate/primer layer/printing layer | 3 |
| Example 30 | Water-soluble resin composition 9 | PET | Substrate/primer layer/printing layer | 3 |
| Example 31 | Water-soluble resin composition 10 | PET | Substrate/primer layer/printing layer | 3 |
| Example 32 | Water-soluble resin composition 11 | PET | Substrate/primer layer/printing layer | 3 |
| Example 33 | Water-soluble resin composition 12 | PET | Substrate/primer layer/printing layer | 3 |
| Example 34 | Water-soluble resin composition 13 | PET | Substrate/primer layer/printing layer | 2 |
| Comparative Example 4 | Water-soluble resin composition 15 | PET | Substrate/primer layer/printing layer | 1 |

<Evaluation of Printing Layer>
[Method for Preparing Pigment Aqueous Dispersion]
(1) Into a 2 L flask, 236 parts by mass of deionized water was weighed, and 60 parts by mass of a water-insoluble styrene-acrylic polymer (manufactured by BASF, Joncryl 690, weight average molecular weight: 16500, acid value: 240 mgKOH/g) and 36.5 parts by mass of a 5 N sodium hydroxide solution (sodium neutralization degree: 60 mol %) were charged. The mixture was stirred at 200 rpm for 2 hours using an anchor blade to obtain 332.5 parts by mass of an aqueous styrene-acrylic polymer solution (solid content concentration: 19.9%). Into a vessel having a disper blade and a volume of 2 L, 331.7 parts by mass of the aqueous solution and 448.3 parts by mass of deionized water were added, and stirred at 1400 rpm for 15 minutes using a disper (Ultra Disper manufactured by ASADA Co., Ltd.) while being cooled in a water bath at 0° C.
(2) Then, 220 parts of a cyan pigment (C. I. Pigment Blue 15: 3) was added, and the mixture was stirred at 6400 rpm for 1 hour. The dispersion liquid was placed into a wet disperser (Ultra Apex Mill UAM05 manufactured by HIROSHIMA METAL & MACHINERY CO., LTD.) filled with 80% of zirconia beads (XTZ ball manufactured by NIKKATO CORPORATION, 0.3 mmφ), dispersed for 5 passes at a peripheral speed of 8 m/s and a flow rate of 200 g/min while being cooled with cooling water at 5° C., and then filtered using a 200 mesh wire mesh.
(3) To 500 parts by mass (pigment: 110 parts by mass, polymer: 33 parts by mass) of the filtrate obtained above, 7.3 parts by mass of trimethylolpropane polyglycidyl ether (Denacol EX-321 L manufactured by Nagase ChemteX Corporation) (corresponding to 40 mol % relative to the carboxylic acid to be a crosslinking reaction point contained in the acrylic acid in the polymer) and 1 part by mass of a mildewproofing agent (Proxel LV (S), manufactured by Lonza Japan, effective content: 20%) were added, 43.2 parts by mass of deionized water was further added so that the solid content concentration would be 27.3% by mass, and the mixture was stirred at 70° C. for 3 hours, and then filtered with a 200 mesh wire mesh to obtain 550.5 parts by mass of an aqueous dispersion of pigment-containing polymer particles (content of pigment-containing polymer particles: 27.3% by mass, average particle size: 280 nm). The polymer that constitutes the pigment-containing polymer particles was a water-insoluble polymer.

[Method for Preparing Ink Composition 1]
The water-soluble resin composition 14 synthesized above (4.00 g) was weighed and dissolved in 27.45 g of deionized water heated to 80° C., 13.47 g of the pigment aqueous dispersion and 1.10 g of a thickener (ADEKA NOL UH-420 manufactured by ADEKA CORPORATION) were added to the obtained aqueous solution, and the mixture was stirred at 150 rpm. A mixed solution obtained by adding 0.30 g of a 50% by mass solution of 2,4,7,9-tetramethyl-5-decine-4,7-diol in propylene glycol (Surfynol 104 PG-50 manufactured by Air Products & Chemicals Inc.) and 0.15 g of PEG-11 methyl ether dimethicone (KF-6011 manufactured by Shin-Etsu Chemical Co., Ltd.) to 3.50 g of diethylene glycol monoisobutyl ether (manufactured by FUJIFILM Wako Pure Chemical Corporation) was further added thereto, and the mixture was stirred at room temperature for 30 minutes and then filtered with a stainless steel wire mesh (200 mesh) to obtain an ink composition 1.

[Method for Preparing Ink Composition 2]
The water-soluble resin composition 14 synthesized above (2.00 g) was weighed and dissolved in 8.00 g of deionized water heated to 80° C., and 10.00 g of 2-propanol (manufactured by FUJIFILM Wako Pure Chemical Corporation) was added to the obtained aqueous solution to prepare a diluent. The diluent prepared above (20.00 g) was added to 40.00 g of a commercially available aqueous gravure ink, and the mixture was stirred at room temperature for 30 minutes and then filtered with a stainless steel wire mesh to obtain an ink composition 2.

[Method for Preparing Ink Composition 3]
An ink composition 3 was obtained in the same manner as in the method for preparing an ink composition 1 except that 2-propanol was not added.

[Preparation of Sample]
Using each ink composition described in Table 3, gravure printing was performed on a corona-treated surface of a PET film (manufactured by FUTAMURA CHEMICAL CO., LTD., biaxial oriented polyethylene terephthalate film). The printing was performed by solid printing at a printing density of 100% with an attached electronic engraving plate (line number: 175 lines/inch, plate depth: 31 μm) using a tabletop gravure printing machine (manufactured by Matsuo Sangyo Co., Ltd., K-printing proofer).

[Method for Detachment Test of Printed Matter]

Each of the prepared samples was immersed in tap water at a temperature described in Table 3, and the detachment state of the printed matter having a printed matter was observed while stirring. When the printed matter spontaneously dropped from the substrate film almost completely within 10 minutes, the time (minutes) was described.

[Removal Percentage (Hot Water Solubility Test)]

Each of the prepared samples was immersed in 200 mL of tap water at a temperature described in Table 3 and stirred for 10 minutes, and then each sample was dried with hot air at 80° C. for 1 hour. The removal percentage of the printed matter was measured from the area ratio of the printed matter obtained by measuring the areas of the printed matter before immersion in tap water and after drying. For the measurement of the area of the printed matter, an image was captured using a scanner function in which the image quality was set to 200 dpi using a digital full-color multifunction printer MP C5504 manufactured by Ricoh Co., Ltd., and the area of the printed matter was measured using an image obtained by binarizing the scanned image with the threshold value set to 236 using an image processing software "Win-Roof" manufactured by MITANI CORPORATION. The removal percentage was calculated using the following formula.

Removal percentage (%)=$\{(M-M')/M\} \times 100$

M: Area of printed matter before immersion in tap water
M': Area of printed matter after drying

[Water Resistance Test]

Each sample was immersed in tap water at 25° C. for 24 hours, and then the presence or absence of lifting of the detachment layer having the printed matter on the surface of the substrate film and the tendency of detachment due to scratching with a spatula were observed. The results were evaluated by the following indices.

3: The detachment layer having a printed matter is not lifted, and the printed matter is hardly detached.
2: The detachment layer having a printed matter is not lifted, but the printed matter is slightly easily detached.
1: The detachment layer having a printed matter is lifted, and the printed matter is easily detached with a light force.

The evaluation results are shown in Table 3.

The invention claimed is:

1. A method for removing a printing layer, the method comprising:
    treating a printed matter comprising a water-soluble printing layer with neutral water at 30° C. or more to remove the water-soluble printing layer,
    wherein the water-soluble printing layer comprises a water-soluble resin for printing comprising:
        a monomer unit A having a sulfonate group; and
        a monomer unit B derived from a monomer having no hydrophilic groups other than groups that constitute polymerization in producing the water-soluble resin,
    wherein a percentage of the monomer unit A based on a total of all monomer units is 5 to 35 mol %.

2. A method for removing a printing layer, the method comprising:
    treating a printed matter with neutral water at 30° C. or more to remove a water-soluble printing primer layer and the printing layer,
    wherein the printed matter comprises, in sequence:
        a substrate;
        the water-soluble printing primer layer containing a water-soluble resin for printing; and
        the printing layer, and
    wherein the water-soluble resin comprises:
        a monomer unit A having a sulfonate group; and
        a monomer unit B derived from a monomer having no hydrophilic groups other than groups that constitute polymerization in producing the water-soluble resin,
    wherein a percentage of the monomer unit A based on a total of all monomer units is 5 to 35 mol %.

3. The method according to claim 1, wherein a counterion of a sulfonic acid group that constitutes the sulfonate group in the monomer unit A is an alkali metal ion.

4. The method according to claim 1, wherein a content of the sulfonate group in the water-soluble resin is 0.4 to 3 mmol/g.

5. The method according to claim 1, wherein a weight average molecular weight of the water-soluble resin is 1000 to 80000.

6. The method according to claim 1, wherein
    the monomer unit A is a dicarboxylic acid-derived monomer unit A, and

TABLE 3

| | | Examples | | Comparative Example |
|---|---|---|---|---|
| | | 35 | 36 | 5 |
| | Ink composition | Ink composition 1 | Ink composition 2 | Ink composition 3 |
| Ink composition (% by mass) | Pigment aqueous dispersion | 9.70 | 0.00 | 0.00 |
| | Commercially available aqueous gravure ink | 0.00 | 66.70 | 66.70 |
| | Water-soluble resin composition 1 | 8.00 | 3.33 | 0.00 |
| | Diethylene glycol monoisobutyl ether | 7.00 | 0.00 | 0.00 |
| | 2-propanol | 0.00 | 16.7 | 16.7 |
| | Thickener | 0.66 | 0.00 | 0.00 |
| | 2,4,7,9-Tetramethyl-5-decine-4,7-diol | 0.30 | 0.00 | 0.00 |
| | PEG-11 methyl ether dimethicone | 0.30 | 0.00 | 0.00 |
| | Propylene glycol | 0.30 | 0.00 | 0.00 |
| | Deionized water | Balance | Balance | Balance |
| | Substrate | PET | PET | PET |
| Evaluation | Water temperature when dissolved (° C.) | 80 | 80 | 80 |
| | Detachment time (min) | 10 | 10 | 60 |
| | Removal percentage (%) | 96 | 84 | 0 |
| | Water resistance test | 3 | 3 | No data |

*PET in Table 3 represents biaxial oriented polyethylene terephthalate (manufactured by FUTAMURA CHEMICAL CO., LTD.).

the monomer unit B is a dicarboxylic acid-derived monomer unit B, which is derived from a dicarboxylic acid having no other hydrophilic group.

7. The method according to claim 6, wherein a monomer from which the dicarboxylic acid-derived monomer unit A is derived is at least one sulfonate group-containing aromatic dicarboxylic acid salt.

8. The method according to claim 6, wherein a monomer from which the dicarboxylic acid-derived monomer unit A is derived is 5-sulfoisophthalic acid.

9. The method according to claim 6, wherein the dicarboxylic acid from which the dicarboxylic acid-derived monomer unit B is derived is at least one selected from the group consisting of an aromatic dicarboxylic acid having no other hydrophilic group and an aliphatic dicarboxylic acid having no other hydrophilic group.

10. The method according to claim 9, wherein the dicarboxylic acid from which the dicarboxylic acid-derived monomer unit B is derived is at least one aromatic dicarboxylic acid having no other hydrophilic group selected from the group consisting of terephthalic acid, isophthalic acid, 2,5-furandicarboxylic acid, and 2,6-naphthalenedicarboxylic acid.

11. The method according to claim 9, wherein the dicarboxylic acid from which the dicarboxylic acid-derived monomer unit B is derived is at least one aliphatic dicarboxylic acid having no other hydrophilic group selected from the group consisting of malonic acid, succinic acid, glutaric acid, adipic acid, 1,4-cyclohexanedicarboxylic acid, and 1,3-adamantanedicarboxylic acid.

12. The method according to claim 9, wherein a percentage of a total of an aromatic dicarboxylic acid based on a total of the dicarboxylic acid from which the dicarboxylic acid-derived monomer unit B is derived is 50 mol % or more and 100 mol % or less.

13. The method according to claim 6, wherein the water-soluble resin is a water-soluble polyester resin that includes a diol monomer unit C, which is derived from a diol C that has a carbon number of 2 to 31.

14. The method according to claim 13, wherein the diol C is an aliphatic diol.

15. The method according to claim 14, wherein the aliphatic diol is at least one selected from the group consisting of a chain diol and a cyclic diol.

16. The method according to claim 15, wherein the aliphatic diol is at least one chain diol selected from the group consisting of ethylene glycol, 1,2-propanediol, 1,3-propanediol, 1,4-butanediol, 1,2-butanediol, 1,3-butanediol, neopentyl glycol, 1,5-pentanediol, 1,6-hexanediol, diethylene glycol, triethylene glycol, polyethylene glycol, dipropylene glycol, and polypyrene glycol.

17. The method according to claim 15, wherein the aliphatic diol is at least one cyclic diol selected from the group consisting of 1,4-cyclohexanedimethanol, hydrogenated bisphenol A, isosorbide, bisphenoxyethanolfluorene, bisphenol fluorene, biscresoxyethanolfluorene, and biscresol fluorene.

18. The method according to claim 1, wherein the water-soluble resin is contained in a water-soluble resin composition in a content of 30% by mass or more and 100% by mass or less.

\* \* \* \* \*